United States Patent
Funke et al.

(10) Patent No.: US 12,291,191 B1
(45) Date of Patent: May 6, 2025

(54) PARKING LOCATION FILTER

(71) Applicant: Zoox, Inc., Foster City, CA (US)

(72) Inventors: Joseph Funke, Redwood City, CA (US); Steven Cheng Qian, San Francisco, CA (US); Zheyuan Xie, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 195 days.

(21) Appl. No.: 18/087,689

(22) Filed: Dec. 22, 2022

(51) Int. Cl.
*B60W 30/06* (2006.01)
*B60W 60/00* (2020.01)

(52) U.S. Cl.
CPC ........ *B60W 30/06* (2013.01); *B60W 60/0011* (2020.02); *B60W 2510/20* (2013.01); *B60W 2520/10* (2013.01); *B60W 2520/105* (2013.01); *B60W 2552/05* (2020.02); *B60W 2554/80* (2020.02); *B60W 2556/10* (2020.02)

(58) Field of Classification Search
CPC ............. B60W 30/06; B60W 60/0011; B60W 2556/10; B60W 2554/80; B60W 2552/05; B60W 2510/20; B60W 2520/10; B60W 2520/105

See application file for complete search history.

(56) References Cited

U.S. PATENT DOCUMENTS

| | | | |
|---|---|---|---|
| 9,087,453 B2 * | 7/2015 | Krivacic | G06Q 10/02 |
| 10,142,188 B2 | 11/2018 | Gravenites et al. | |
| 11,142,188 B2 * | 10/2021 | Funke | G08G 1/141 |
| 11,183,059 B2 * | 11/2021 | Zhou | G06F 16/29 |
| 11,767,035 B2 * | 9/2023 | Wang | B60W 30/09 |
| | | | 701/26 |
| 2014/0249742 A1 * | 9/2014 | Krivacic | G08G 1/14 |
| | | | 340/932.2 |
| 2014/0285361 A1 * | 9/2014 | Tippelhofer | G08G 1/143 |
| | | | 340/932.2 |
| 2018/0215374 A1 * | 8/2018 | Lee | G05D 1/12 |
| 2018/0349792 A1 * | 12/2018 | Zhao | G06N 20/00 |
| 2020/0160712 A1 * | 5/2020 | Beaurepaire | G08G 1/148 |

(Continued)

OTHER PUBLICATIONS

U.S. Appl. No. 17/394,334, filed Aug. 4, 2021, Caldwell, et al., "Vehicle Trajectory Control Using a Tree Search", 90 pages.

(Continued)

*Primary Examiner* — Ramsey Refai
(74) *Attorney, Agent, or Firm* — Lee & Hayes, P.C.

(57) ABSTRACT

Techniques for determining parking spaces and/or parking trajectories for a vehicle based on multistage filtering are discussed herein. In some examples, a vehicle may navigate to a destination within an environment. The vehicle may receive a set of parking locations and perform filtering operations to determine a subset of the parking locations. For example, the vehicle may use a list of parking characteristics (e.g., conditions) to filter the set of parking spaces. Based on determining the subset of parking spaces, the vehicle may generate a set of candidate trajectories to the subset of parking spaces. The vehicle may determine a subset of the candidate trajectories based on filtering the set of candidate trajectories according to various constraints. Further, the vehicle may determine a cost for the subset of candidate trajectories. Based on the costs, the vehicle may determine a candidate trajectory for the vehicle to follow.

20 Claims, 6 Drawing Sheets

(56) References Cited

U.S. PATENT DOCUMENTS

2021/0048818 A1* 2/2021 Funke .................. G05D 1/617
2022/0371613 A1* 11/2022 Caldwell ............. B60W 60/001
2022/0388501 A1 12/2022 Jian et al.

OTHER PUBLICATIONS

U.S. Appl. No. 17/485,041, filed Sep. 24, 2021, Schwartz, et al., "Optimization Based Planning System", 49 pages.
U.S. Appl. No. 18/072,015, filed Nov. 30, 2022, Narayanan, et al., "Vehicle Trajectory Tree Search for Off-Route Driving Maneuvers", 66 pages.
Office Action for U.S. Appl. No. 18/087,709, Dated Dec. 3, 2024, Funke, "Determining Parking Locations Based on Multistage Filtering," 6 pages.

* cited by examiner

PARKING LOCATION FILTER

BACKGROUND

An autonomous vehicle may navigate along designated routes or between waypoints. For example, when a control system receives a request from a user device to pick up a passenger or cargo at a location and provide transport to a destination location, the autonomous vehicle may receive, from the control system, instructions to navigate from the pickup location to the destination location. In some circumstances, the autonomous vehicle may be required to park in order to pick the passenger or cargo up at the pickup location or drop off the passenger or cargo at the destination location. In some instances, such as when the area of the pickup location and/or destination location includes parking spaces, the vehicle may identify which parking space to utilize. However, in many cases, such techniques may result in processing delays and errors in controlling the vehicle in parking situations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
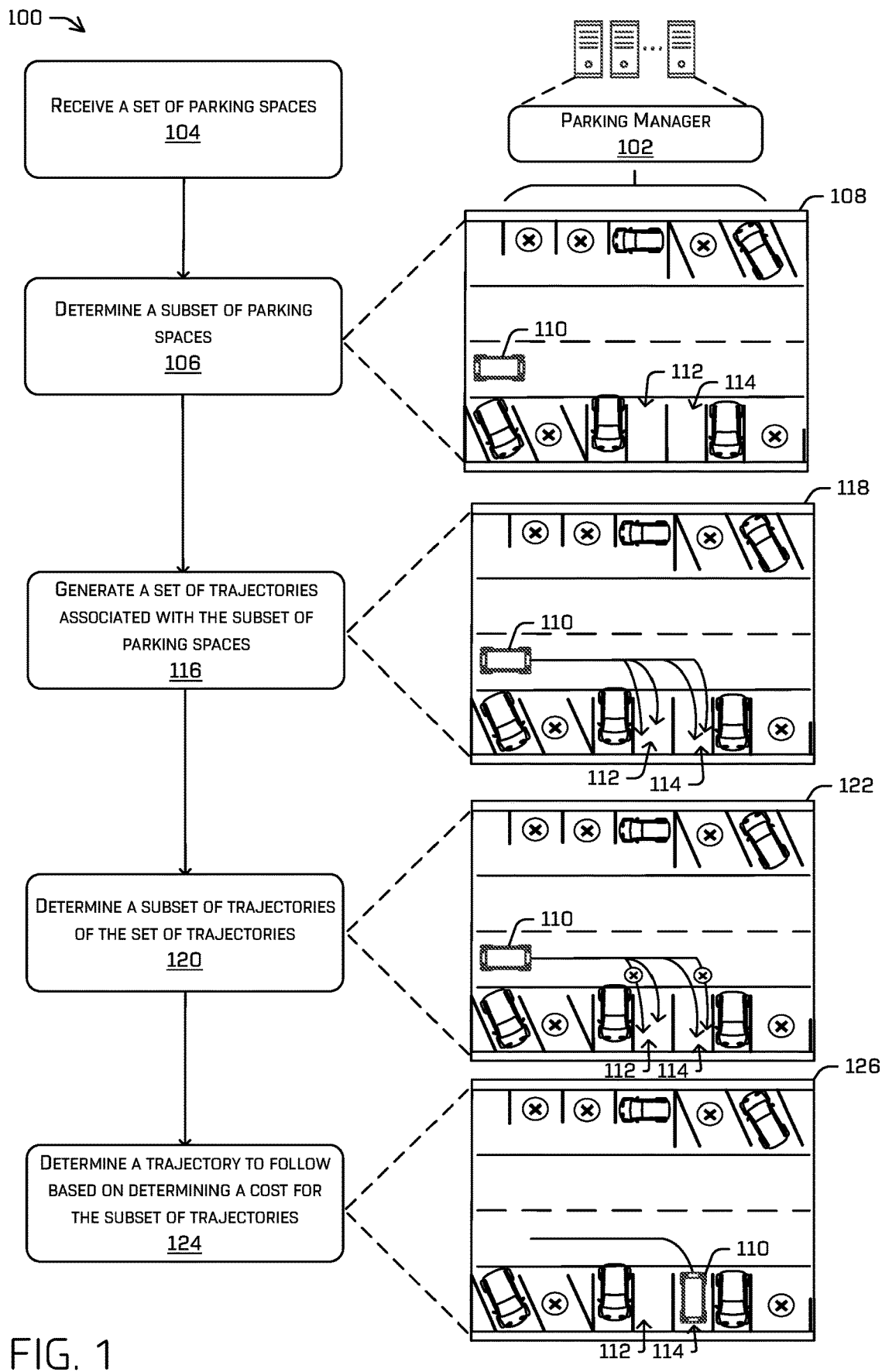
FIG. 1 is a pictorial flow diagram illustrating an example technique for determining a parking trajectory based on filtering potential parking spaces, filtering potential trajectories, and determining costs for the potential trajectories, in accordance with one or more examples of this disclosure.

Techniques for determining parking spaces and/or parking trajectories for a vehicle are discussed herein. In some examples, such techniques can be based on based on multistage filtering. As described herein, multistage filtering techniques may be used to filter candidate parking spaces and/or candidate parking trajectories, resulting in a candidate trajectory for a vehicle to follow to an optimal parking space. In some examples, a vehicle (such as an autonomous vehicle) may navigate to a destination (e.g., pickup location, drop off location, delivery location, service location etc.) within an environment while in a primary navigation mode. Upon determining that the vehicle is within a threshold distance from the destination, the vehicle and/or associated search algorithm may transition to a parking mode configured to identify a parking location for the vehicle. As a non-limiting example of which, when performing a tree search to determine a trajectory, a "pick-up/drop-off" action may be explored as a further node once in a threshold distance of a desired destination, whereas other nodes of the tree may comprise exploration of other actions such as, but not limited to, merge left, merge right, continue straight, slow down, turn left, turn right, or any other generic action the vehicle is capable of performing. In various examples, the vehicle may receive and/or identify a set of parking locations proximate the destination (e.g., when a pick-up/ drop-off action is being considered), and perform filtering operations to determine a subset of the parking locations. For example, the vehicle may determine a number of parking characteristics (e.g., conditions) associated with the set of parking spaces. Further, the vehicle may use the parking characteristics to filter the set of parking spaces and determine a subset of optimal parking spaces. Based on determining the subset of parking spaces, the vehicle may generate a set of candidate trajectories that cause the vehicle to navigate to parking spaces of the subset of parking spaces (e.g., when performing the tree search). In some examples, the vehicle may determine a subset of the candidate trajectories based on filtering the set of candidate trajectories according to various constraints. In such instances, the vehicle may determine a cost for each of the candidate trajectories of the subset of candidate trajectories. Based on determining the costs for the candidate trajectories, the vehicle may determine a candidate trajectory for the vehicle to follow. As discussed throughout this disclosure, the techniques described herein may improve vehicle safety, driving efficiency, and parking efficiency by filtering parking spaces and/or parking trajectories, thereby reducing the amount of data to process further reducing the delay of vehicle action.

In some examples, an autonomous vehicle may navigate within a driving environment. For example, an autonomous vehicle may receive requests to transport pedestrians and/or customers between pickup and drop off locations. Further, autonomous vehicles may also be instructed to deliver goods and/or services within particular regions of the environment. As such, the autonomous vehicle may generate one or more trajectories to follow while traversing to the destination.

As the autonomous vehicle approaches the destination, the vehicle may attempt to perform a parking action. Performing a parking action may include causing the vehicle to identify one or more available parking spaces and determining at which parking space the vehicle should park. In some examples, a parking space can be determined based on map data and/or based on sensor data identifying portion(s) of an environment suitable for parking (e.g., out of traffic, free from obstacles such as pedestrians, water, debris, etc.). Based on identifying the potential parking location(s), the vehicle may generate one or more candidate trajectories for the vehicle to follow to such parking locations (e.g., parking spaces). In such instances, the candidate trajectory may instruct the vehicle to navigate through the environment and perform a parking action by entering the parking location and stopping the vehicle.

In some examples, determining or otherwise selecting the optimal parking spaces may cause the vehicle to experience delayed reaction times and/or erroneous actions. For example, the vehicle may determine that it is within a threshold distance from a destination, and as such, may identify multiple locations to park. In such examples, the vehicle may generate multiple potential trajectories that instruct the vehicle how to navigate to the parking spaces. However, determining and/or evaluating all of the potential trajectories for all of the potential parking spaces may result in massive amounts of data for vehicle components to process. For example, the vehicle may receive a large number of potential parking spaces and may subsequently generate a large number of potential trajectories that lead to each of the potential parking spaces. Consequently, such a massive number of potential scenarios and data to evaluate may cause the vehicle to experience delayed responses and/or errors in controlling the vehicle.

To address these and other technical problems and inefficiencies, the techniques described herein include a parking system (which also may be referred to as a "parking manager" or a "parking component") to select or otherwise determine parking trajectories and/or parking spaces based on a multistage filtering technique. Further, the parking manager may leverage a plurality of characteristics and/or factors to filter the set of parking spaces. Further, the parking manager may utilize vehicle and/or environmental constraints to filter the set of candidate trajectories. Technical solutions discussed herein solve one or more technical problems associated with evaluating excessive amounts of potential driving scenarios which may cause the autonomous vehicle to experience response delays and/or errors in controlling the vehicle.

Initially, the parking manager may receive and/or generate a trajectory to follow to a destination within an environment. A vehicle may receive a request and/or instructions to navigate to a destination. Such requests may include transporting pedestrians and/or customers between pickup and drop off locations, in addition to delivering goods and/or services to regions of the environment. Based on the request, the vehicle may receive a trajectory to follow while navigating through the environment to the destination.

In some examples, the vehicle may transition mode types based on being within a threshold distance of the destination. As used herein, transitioning between two modes may comprise alternating between one or more trajectory generation methods (e.g., following a lane reference vs. planning through an unmapped region) and/or augmenting or replacing portions of a generation method with others (e.g., in a tree search including a pick-up/drop-off action as opposed to other actions). Such techniques can be found, for example, in application Ser. No. 17/485,041, filed Sep. 24, 2021, and titled "Optimization Based Planning System," in addition to application Ser. No. 17/394,334, filed Aug. 4, 2021, and titled "Vehicle Trajectory Control Using a Tree Search," and in addition to U.S. Pat. No. 10,142,188, filed Oct. 12, 2021, and titled "Action-Based Reference Systems For Vehicle Control," the contents of which is herein incorporated by reference in its entirety for all purposes. The vehicle may utilize numerous operation modes configured to instruct the vehicle when and how to generate and/or select parking spaces and trajectories. Use of such modes may be determined based on the location of the vehicle within the environment, the location of the vehicle relative to the destination, and/or the action being performed by the vehicle. In some examples, different operating mode types may cause the vehicle to perform different operations when generating, selecting, and/or determining a trajectory to follow. When operating in a primary mode, the vehicle may perform a first set of operations. In such instances, the vehicle may use the first set of operations to generate a trajectory and/or determining which potential trajectory to select while navigating to the destination. Further, when operating in a parking mode, the parking manager may perform a second set of operations. The second set of operations may include some or all of the first set of operations, in addition to additional operations. Based on being in a parking mode, the parking manager may perform additional operations associated with determining or otherwise selecting parking trajectories and/or parking spaces. In some examples, the vehicle may transition from the primary mode to a parking mode based on determining that the vehicle is within a threshold distance from the destination. In such instances, the threshold distance may be determined based on a number of different factors, such as the environment type, time of day, and/or other factors. In other situations, the threshold distance may be a fixed distance from the destination.

In some examples, the parking manager may receive a set of potential (e.g., candidate) parking spaces for the vehicle. The vehicle may receive a set of parking locations (e.g., parking spaces, parking garages, parking lots, etc.) within a threshold distance of the destination. The threshold distance may be determined based on a number of factors, such as an environment type (e.g., city, neighborhood, etc.), occupant characteristics (e.g., age, disability, etc.), event data, historical data (e.g., previously used parking spaces proximate the destination, previous parking availability proximate the destination, etc.), etc. The vehicle may receive the set of parking spaces from a database (e.g., on-vehicle database or off-vehicle database) available to the vehicle. The database may include map data that indicates the locations of parking spaces proximate the destination. In addition to receiving the set of parking spaces and the associated locations of such parking spaces, the parking manager may also receive the shape and/or size (e.g., dimensions) of the parking spaces, in addition to the target poses associated with each received parking space. Such information may be stored in a data-based with the parking spaces. In at least some examples, parking locations may be determined based at least in part on detecting spaces based at least in part on sensor data available to the vehicle. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

In some examples, the parking manager may determine a subset of parking spaces by performing filtering operations. For example, based on the parking manager receiving a set of parking spaces, the parking manager may filter a portion of the parking spaces based on a variety of characteristics, conditions, and/or factors. Such filtering techniques may enable the parking manager to consider and/or evaluate a smaller subset of potential scenarios which may result in reduced processing time and/or memory consumption.

In some examples, the parking manager may determine characteristics, conditions, and/or factors to use for filtering the set of parking spaces. The parking manager may determine a list of characteristics, conditions, and/or factors to evaluate when filtering the parking spaces. In some examples, characteristics, conditions, and/or factors may become more or less relevant in addition to being updated and/or changed based on the geographic location of the vehicle, the pose of the vehicle, the location of the vehicle relative to the parking spaces, the distance of the vehicle to the parking spaces, traffic conditions, and/or other factors.

The list of characteristics, conditions, and/or factors may include, but is not limited to, an availability status (e.g., occupied) of a parking space, a parking space that is located behind the autonomous vehicle, a parking space that is within a threshold distance from the vehicle (e.g., the parking space is too close based on the current velocity of the vehicle), a parking space that is oriented at a suboptimal angle (e.g., determined that the angle difference between the heading of the parking space and the heading of the vehicle exceeds a threshold), a parking space that meets or exceeds a threshold distance from the vehicle (e.g., distance may be based on environment type, event data, occupant data (e.g., age, disability, etc.), etc.), a parking space that is located on the opposing side of the road, a handicap parking space (e.g., filter out if the occupant data indicates the occupant is not disabled, maintain the handicap parking space if the occupant data indicates the occupant is disabled), and/or any other characteristic, condition, and/or factor. In some examples, the parking manager may determine a rank and/or hierarchy of such characteristics, conditions, and/or factors. Such a rank or hierarchy may indicate a prioritization and/or importance of the characteristics, conditions, and/or factors. For example, characteristics, conditions, and/or factors with a high rank may indicate that such a condition is more important to filter out in relation to the conditions of a lower rank. In some cases, one or more weights may be used in addition to or instead of ranks or hierarchy.

In some examples, the parking manager may use the characteristics, conditions, and/or factors to determine a subset of parking spaces. In some examples, the parking manager may evaluate the set of parking spaces using the list of characteristics, conditions, and/or factors. The parking manager may iterate through some or all of the parking spaces of the set of parking spaces and determine whether such parking spaces satisfy the characteristics, conditions, and/or factors. A parking space may satisfy the characteristics, conditions, and/or factors if the parking space does not fall within the description of any of the characteristics, conditions, and/or factors. In some examples, the parking manager may perform one or more types of filtering operations. For example, the parking manager may perform a first type of filtering operation configured to determine a subset of parking spaces that satisfy the listed characteristics, conditions, and/or factors. Such a filtering type may exclude parking spaces that fall within the description of any of the characteristics, conditions, and/or factors. Alternatively, or additionally, the parking manager may perform a second type of filtering operation configured to generate costs for each parking space in the set of parking spaces, and use such costs to determine the subset of parking spaces.

In some examples, the parking manager may perform a first type of filtering operation. The parking manager may evaluate the parking spaces according to the characteristics, conditions, and/or factors. In some examples, the parking manager may include parking spaces in the subset of parking spaces based on determining that the parking spaces satisfy the characteristics, conditions, and/or factors. Based on determining that a parking space violates the characteristics, conditions, and/or factors and falls within the description of such a factor, the parking manager may exclude such a parking space from the subset of parking spaces. In contrast, if the parking space does not fall within the description of the characteristics, conditions, and/or factors, the parking manager may include such a parking space in the subset of parking spaces.

In some examples, the parking manager may determine the subset of parking spaces based on the first type of filtering operation. For example, after identifying how many parking spaces satisfied the characteristics, conditions, and/or factors, the parking manager may determine whether too few or too many parking spaces remain after the filtering operations. For example, the parking manager may compare the number of parking spaces that satisfied the conditions to a first threshold that represents a maximum allowed number of parking spaces. In some examples, if the number of remaining parking spaces exceeds the first threshold, the parking manager may modify the characteristics, conditions, and/or factors and re-filter the parking spaces. In alternative examples there may not be a first threshold. In some examples, the parking manager may also compare the number of parking spaces that satisfied the conditions to a second threshold that represents a minimum allowed number of parking spaces. In this example, the parking manager may modify the characteristic, condition, and/or factor rankings and re-filter the parking spaces. For example, filtering out parking spaces that are beyond a certain distance (e.g., too far away) may be the lowest ranked factor. Further, if the parking manager determines that there is at or below a threshold number of parking spaces that satisfied the conditions, the parking manager may either remove such a parking space distance filter or modify the distance to be a larger distance. After removing or modifying the factor, the parking manager may re-filter the parking spaces that were filtered out based on being too far away. Such parking spaces may be included in the subset based on the re-filtering. However, this is not intended to be limiting, the parking manager may rank the characteristics, conditions, and/or factors in differing orders, and may also remove and/or modify such characteristics, conditions, and/or factors in different ways.

In some examples, if the parking manager determines that there are no available parking spaces after performing the filtering and/or re-filtering operations, the parking manager may cause the vehicle to perform a double-parking action. For example, the parking manager may send instructions to the vehicle to identify a location to double-park.

Alternatively, or additionally, the parking manager may perform a second type of filtering operation. The second type of filtering may include the parking manager generating a cost for each parking space within the set of parking spaces. The parking manager may generate the costs for the parking spaces based on evaluating the characteristics, conditions, and/or factors. Parking spaces with high-cost values may be indicative of suboptimal parking space, whereas parking spaces with low-cost values may be indicative of more optimal parking spaces. When determining cost values, such values may be negatively affected when a parking space falls within the description of a characteristic, condition, and/or factor. Further, the rank of the characteristic, condition, and/or factor may also affect the cost values. For example, one of the conditions may restrict a vehicle form parking in handicap parking spaces when the occupants of the vehicle are not handicap. As such, the handicap parking condition may be highly ranked (e.g., weighted) and may have a large impact on the cost.

In some examples, the parking manager may determine the subset of parking spaces based on the costs. After determining a cost for each of the parking spaces of the set of parking spaces, the parking manager may determine the subset of parking spaces based on including a predetermined number of parking spaces that have the lowest costs values (e.g., most optimal parking spaces). Additionally, or alternatively, the parking manager may also compare the cost values of the parking spaces to threshold value. In some examples, the parking manager may use an additional threshold validation to ensure that parking spaces with cost values that are high are not included within the subset, despite being within the predetermined number of parking spaces with the lowest cost values. As such, if parking space has a cost value that exceeds a threshold value, such a parking space may be excluded from the subset of parking spaces.

In some examples, the parking manager may generate a set of trajectories to each of the parking spaces of the subset of parking spaces. After determining a subset of parking spaces, the parking manager may generate an initial parking trajectory to any one or more parking space of the subset of parking spaces. The parking manager may generate the initial parking trajectory using the state information (e.g., location data, pose data, velocity data, acceleration data, etc.) of the vehicle and the location data of the parking space. The parking manager may generate a parking trajectory from the location of the vehicle to a center location of the parking space. Thus, the vehicle may generate a single initial parking trajectory for any number of parking spaces and/or multiple trajectories to a single parking space.

In some examples, the parking manager may generate multiple candidate trajectories based on the initial parking trajectory. For example, the parking manager may input the initial parking trajectory into a parking trajectory generating component configured to take as input a single initial trajectory, and generate, as output, multiple candidate trajectories to the associated parking space. Such candidate trajectories may differ in numerous ways, such as the overall route, the velocity, the angle at which the vehicle approaches the parking space, the acceleration, the pose at different instances along the candidate trajectory, etc. In some examples, the parking manager may input some or all of the initial parking trajectories into the parking trajectory generating component. Based on inputting the initial parking trajectories into the parking trajectory generating component, the parking manager may include a set of candidate trajectories.

In some examples, the parking manager may determine a subset of candidate trajectories based on performing filtering operations. In some examples, the parking manager may evaluate the set of candidate trajectories using a list of constraints. The parking manager may iterate through some or all of the candidate trajectories and determine whether such candidate trajectories satisfy the constraints. In some examples, such parking spaces may be explored as part of a tree search for determination of a trajectory. A candidate trajectory may satisfy a constraint if the candidate trajectory does not fall within the description of the constraints. In some examples, a list of constraints may include a steering limitation, an acceleration limitation, a velocity limitation, a predicted interaction with an object, a crossing of adjacent parking space boundaries, a pose limitation (e.g., within the parking space and/or along the trajectory), kinematic and/or dynamic constraints, and/or other constraints. As such, the parking manager may filter out some or all of the candidate trajectories that violate some or all of the constraints. In some instances, based on performing the filtering operations, the parking manager may determine a subset of candidate trajectories from the set of candidate trajectories.

In some examples, the parking manager may determine a cost associated with candidate trajectories. Based on determining the subset of candidate trajectories, the parking manager may determine a cost for each candidate trajectory of the subset candidate trajectories. The cost may be an accumulation of one or more different costs.

In some examples, the parking manager may determine a candidate trajectory based at least in part on the cost. For example, the parking manager may select or otherwise determine a candidate trajectory of the subset of candidate trajectories based on determining which candidate trajectory has the lowest cost. Based on determining a candidate trajectory, the parking manager may cause the vehicle to follow the determined candidate trajectory, or the parking manager may send the candidate trajectory and the associated cost to additional planning components which may utilize such information for further planning operations.

In some examples, the parking manager may cause the vehicle to traverse to the parking space based on the candidate trajectory. Upon identifying the candidate trajectory with the lowest cost, the vehicle may follow the candidate trajectory to the parking space. Further, the candidate trajectory may cause the vehicle to park within the parking space according to the state information.

As illustrated by these examples, the techniques discussed herein can improve the functioning, safety, and efficiency of the autonomous and semi-autonomous vehicles operating in various driving environments. The use of a multistage filtering techniques may allow a vehicle to more efficiently determine or otherwise select optimal parking trajectories and/or parking spaces. For example, a destination location for an autonomous vehicle may include large numbers of potential parking spaces. If the vehicle generates large numbers of candidate trajectories to each of the potential parking spaces, the vehicle will have enormous amounts of potential scenarios to consider and/or evaluate. Evaluating a large number of potential scenarios may cause vehicle components to process massive amounts of data which may result in delays in vehicle action. Such delays in vehicle action may cause the vehicle to perform erroneous and/or suboptimal parking actions.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may assume control of the vehicle to park the vehicle or provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like.

FIG. 1 is a pictorial flow diagram illustrating an example process 100 for determining a parking trajectory based on filtering potential parking spaces, filtering potential trajectories, and determining costs for the potential trajectories. As shown in this example, some or all of the operations in the example process 100 may be performed by a parking manager component integrated within a perception component, a prediction component, a planning component, and/or other components and systems within an autonomous vehicle. For instance, as shown in this example, example process 100 may be implemented using a parking manager 102. As described below in more detail, the parking manager 102 may include various components, such as a parking space filtering component, a trajectory generating component, a trajectory filtering component, a cost generating component, and/or a trajectory determining component, which may be configured to receive a set of parking spaces, determine a subset of parking spaces, generate a set of trajectories to the subset of parking spaces, determine a subset of trajectories, determine a trajectory, and/or control the vehicle based on the candidate trajectory.

At operation 104, the parking manager 102 may receive and/or determine a set of parking spaces. A vehicle may receive a request and/or instructions to navigate to a destination. Based on the request, the vehicle may receive a trajectory to follow while navigating through the environment to the destination.

In some examples, the vehicle may transition mode types based on being within a threshold distance of the destination. As used herein, transitioning between two modes may comprise alternating between one or more trajectory generation methods (e.g., following a lane reference vs. planning through an unmapped region) and/or augmenting or replacing portions of a generation method with others (e.g., in a tree search including a pick-up/drop-off action as opposed to other actions). The vehicle may utilize numerous operation modes configured to instruct the vehicle when and how to generate and/or select parking spaces and trajectories. In some examples, different operating mode types may cause the vehicle to perform different operations when generating, selecting, and/or determining a trajectory to follow. When operating in a primary mode, the vehicle may perform a first set of operations. In such instances, the vehicle may use the first set of operations to generate a trajectory and/or determining which potential trajectory to select while navigating to the destination. Further, when operating in a parking mode, the parking manager may perform a second set of operations. The second set of operations may include some or all of the first set of operations, in addition to additional operations. Based on being in a parking mode, the parking manager may perform additional operations associated with determining or otherwise selecting parking trajectories and/or parking spaces. In some examples, the vehicle may transition from the primary mode to a parking mode based on determining that the vehicle is within a threshold distance from the destination. In such instances, the threshold distance may be determined based on a number of different factors, such as the environment type, time of day, and/or other factors. In other situations, the threshold distance may be a fixed distance from the destination. As a non-limiting example of which, while performing a tree search, nodes proximate the destination (within the threshold distance thereto) may explore pick-up/drop-off actions (e.g., actions which cause the vehicle to come to a stop at a given location and/or in a given orientation for ingress/egress, etc.).

In some examples, the parking manager 102 may receive or determine a set of potential (e.g., candidate) parking spaces for the vehicle. The parking manager 102 may receive a set of parking spaces within a threshold distance of the destination. The threshold distance may be determined based on a number of factors, such as an environment type (e.g., city, neighborhood, etc.—where urban areas may have higher or lower threshold distances), occupant characteristics (e.g., age, disability, etc.—where older age or disabled occupants may have a smaller threshold distance, whereas younger or non-disabled occupants may have a larger threshold distance), event data (e.g., may cause larger thresholds), historical data (e.g., previously used parking spaces proximate the destination, previous parking availability proximate the destination, etc.), environmental data (e.g., limit the threshold in the event of adverse weather), etc. The parking manager 102 may receive the set of parking spaces from a database (e.g., on-vehicle database or off-vehicle database) available to the vehicle. The database may include map data that indicates the locations of parking spaces or areas proximate the destination. In some examples, the database may be dynamically updated. For example, a vehicle may pass by the geographic region and capture sensor data about parking spaces in the geographic region and use the sensor data to update the database and/or use the output from such detections. As another example, a drone may fly over the geographic region and capture sensor data about parking spaces in the geographic region and use the sensor data to update the database. In addition to receiving the set of parking spaces and the associated locations of such parking spaces, the parking manager may also receive the shape and/or size (e.g., dimensions) of the parking spaces, in addition to the target poses associated with each received parking space. Such information may be stored in a data-based with the parking spaces. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle. In those examples in which the parking area is contemplated (e.g., a parking lane without discrete spaces), the target may provide an orientation, lateral offset, and longitudinal range along the space.

At operation 106, the parking manager 102 may determine a subset of parking spaces or areas. In some examples, the parking manager 102 may determine a subset of parking spaces by performing filtering operations. For example, based on the parking manager 102 receiving a set of parking spaces, the parking manager 102 may filter a portion of the parking spaces based on a variety of characteristics, conditions, and/or factors. Such filtering techniques may enable the parking manager 102 to consider and/or evaluate a smaller subset of potential scenarios which may result in reduced processing time and/or memory consumption.

In some examples, the parking manager 102 may determine characteristics, conditions, and/or factors to use for filtering the set of parking spaces. The parking manager 102 may determine a list of characteristics, conditions, and/or factors to evaluate when filtering the parking spaces. In some examples, characteristics, conditions, and/or factors may become more or less relevant in addition to being updated and/or changed based on the geographic location of the vehicle, the pose of the vehicle, the location of the vehicle relative to the parking spaces, the distance of the vehicle to the parking spaces, traffic conditions, and/or other factors. The list of characteristics, conditions, and/or factors may include an availability status (e.g., occupied) of a parking space, a parking space that is located behind the autonomous vehicle, a parking space that is within a threshold distance from the vehicle (e.g., the parking space is too close based on the current velocity of the vehicle), a parking space that is oriented at a suboptimal angle (e.g., determined that the angle difference between the heading of the parking space and the heading of the vehicle exceeds a threshold), a parking space that meets or exceeds a threshold distance from the vehicle (e.g., distance may be based on environment type, event data, occupant data (e.g., age, disability, etc.), etc.), a parking space that is located on the opposing side of the road, a handicap parking space (e.g., filter out if the occupant data indicates the occupant is not disabled, maintain the handicap parking space if the occupant data indicates the occupant is disabled), and/or any other characteristic, condition, and/or factor. In some examples, the parking manager 102 may determine a rank and/or hierarchy of such characteristics, conditions, and/or factors. Such a rank or hierarchy may indicate a prioritization and/or importance of the characteristics, conditions, and/or factors. For example, characteristics, conditions, and/or factors with a high rank may indicate that such a condition is more important to filter out in relation to the conditions of a lower rank. The vehicle may rank such characteristics, conditions, and/or factors based on parking space availability (e.g., determine whether parking space is occupied), legal requirements (e.g., avoiding parking in illegal locations), occupant safety (e.g., preferred safe drop-off locations), occupant convenience (e.g., limit occupant walking after drop-off), and/or any other ranking mechanism.

In this example, the parking manager 102 may use the characteristics, conditions, and/or factors to determine the subset of parking spaces. Such a determination may be based on filtering out the parking spaces that are in violation of the characteristics, conditions, and/or factors. For example, box 108 illustrates a vehicle approaching a set of candidate parking spaces. As shown in FIG. 1, the parking manager 102 has filtered out a number of parking spaces based on such conditions. In such instances, parking spaces that have been filtered out may be represented by a circle with an "x" inside. In this example, the parking manager 102 may filter out angled parking spaces based on the condition that the vehicle 110 does not park in parking spaces that are oriented at an angle. As such, angled parking spaces on both sides of the road are illustrated as filtered out. Additionally, box 108 illustrates that the furthest parking space on the vehicle's 110 side of the road has been filtered out. In such instances, the parking manager 102 may determine that a parking condition may include filtering out parking spaces that exceed a threshold distance from the vehicle. In this example, the parking manager may also filter out parking spaces that are on an opposite side of the road compared to the vehicle 110, as the condition protects the vehicle 110 from selecting parking spaces that may cause the vehicle 110 be exposed to oncoming traffic. Of course, the description is not meant to be so limiting and such parking locations may be explored in other examples.

After performing the filtering operations, the parking manager 102 may determine a subset of parking spaces. Such a subset of parking spaces did not violate or fall within the description of the characteristics, conditions, and/or factors. In such instances, the subset of parking spaces may include parking space 112 and parking space 114. In this situation, neither parking space 112 nor parking space 114 are subject to the characteristics, conditions, and/or factors.

At operation 116, the parking manager 102 may generate a set of trajectories associated with the subset of parking spaces, specifically parking space 112 and parking space 114. After determining a subset of parking spaces, the parking manager 102 may generate an initial parking trajectory to any number of parking spaces of the subset of parking spaces including potentially multiple trajectories to single parking spaces. The parking manager 102 may generate the initial parking trajectory using the state information (e.g., location data, pose data, velocity data, acceleration data, etc.) of the vehicle 110 and the location data of the parking space. The parking manager 102 may generate a parking trajectory from the location of the vehicle 110 to a center location of the parking space. Thus, the vehicle 110 may generate a single initial parking trajectory for each parking space.

In some examples, the parking manager 102 may generate multiple candidate trajectories based on the initial parking trajectory. For example, the parking manager 102 may input the initial parking trajectory into a parking trajectory generating component configured to take as input a single initial trajectory, and generate, as output, multiple candidate trajectories to the associated parking space (e.g., parking space 112 or parking space 114). Such candidate trajectories may differ in numerous ways, such as the overall route, the velocity, the angle at which the vehicle approaches the parking space, the acceleration, the pose at different instances along the candidate trajectory, etc. In some examples, the parking manager 102 may input some or all of the initial parking trajectories into the parking trajectory generating component. Based on inputting the initial parking trajectories into the parking trajectory generating component, the parking manager 102 may include a set of candidate trajectories.

As shown in FIG. 1, box 118 illustrates the vehicle 110 approaching the subset of parking spaces with a number of candidate trajectories. In this example, the vehicle 110 may have two candidate trajectories that lead to parking space 112, in addition to two candidate trajectories that lead to parking space 114. In such instances, the candidate trajectories may start from the location of the vehicle 110 and continue to a center location of the parking space 112 or parking space 114. Further, as shown in box 118, some or all of the candidate trajectories differ from one another, as such candidate trajectories include different poses, velocities, accelerations, steering requirements, and/or any other factor.

At operation 120, the parking manager 102 may determine a subset of trajectories of the subset of trajectories. In some examples, the parking manager 102 may evaluate the set of candidate trajectories using a list of constraints. The parking manager 102 may iterate through some or all of the candidate trajectories and determine whether such candidate trajectories satisfy the constraints. A candidate trajectory may satisfy a constraint if the candidate trajectory does not fall within the description of the constraints. Of course, a constraint may be specified or designed such that a constraint is satisfied if the candidate trajectory does fall within the description of the constraints. In some examples, a list of constraints may include a steering limitation, an acceleration limitation, a velocity limitation, a predicted interaction with an object, a crossing of adjacent parking space boundaries, a pose limitation (e.g., within the parking space and/or along the trajectory), and/or other constraints. As such, the parking manager 102 may filter out some or all of the candidate trajectories that violate some or all of the constraints. In some instances, based on performing the filtering operations, the parking manager 102 may determine a subset of candidate trajectories from the set of candidate trajectories.

As shown in FIG. 1, box 122 illustrates the vehicle 110 with a subset of candidate trajectories. In this example, the parking manager 102 has filtered out a number of candidate trajectories based on a number of constraints. In such instances, candidate trajectories that have been filtered out may be represented by a circle with an "x" inside. In this example, a candidate trajectory leading to the parking space 112 in addition to a second candidate trajectory leading to parking space 114 have been filtered out based on violating one or more of the constraints. In such instances, the parking manager 102 may filter out such candidate trajectories based on the candidate trajectories violating the steering limitations. Such candidate trajectories cause the vehicle to perform steering maneuvers that exceed the constraint limitations. As such, the parking manager 102 may determine a subset of candidate trajectories that includes a single candidate trajectory leading each of the parking space 112 and the parking space 114.

At operation 124, the parking manager 102 may determine a trajectory to follow based on determining a cost for the filtered trajectories. Based on determining the subset of candidate trajectories, the parking manager 102 may determine a cost for each candidate trajectory of the subset candidate trajectories. The cost may be an accumulation or aggregation of one or more different costs. Such costs may include a reference cost, a obstacle cost, a steering cost, an acceleration cost, a yaw cost, a space cost, an approach cost, an exit cost, a debris cost, a safety cost, a payment cost, and/or any other type of cost. In such instances, the parking manager 102 may combine the various costs into a single overall cost. Such costs may be weighted differently, and as such, different costs may affect the overall cost in different proportions.

In some examples, the parking manager 102 may determine a candidate trajectory based at least in part on the cost. For example, the parking manager 102 may select or otherwise determine a candidate trajectory of the subset of candidate trajectories based on determining which candidate trajectory has the lowest cost. Based on determining a candidate trajectory, the parking manager 102 may cause the vehicle 110 to follow the determined candidate trajectory, or the parking manager 102 may send the candidate trajectory and the associated cost to additional planning components which may utilize such information for further planning operations.

In some examples, the parking manager 102 may cause the vehicle 110 to traverse to the parking space based on the selected candidate trajectory. For example, box 126 illustrates the vehicle 110 following the candidate trajectory leading to parking space 114. In this example, the parking manager 102 may determine a first cost associated with the candidate trajectory leading to parking space 112, and a second cost associated with the candidate trajectory leading to parking space 114. In such instances, the parking manager 102 may determine that the second cost is less than the first cost, and as such, the parking manager 102 may cause the vehicle 110 to navigate to the parking space 114.

Figure 2:
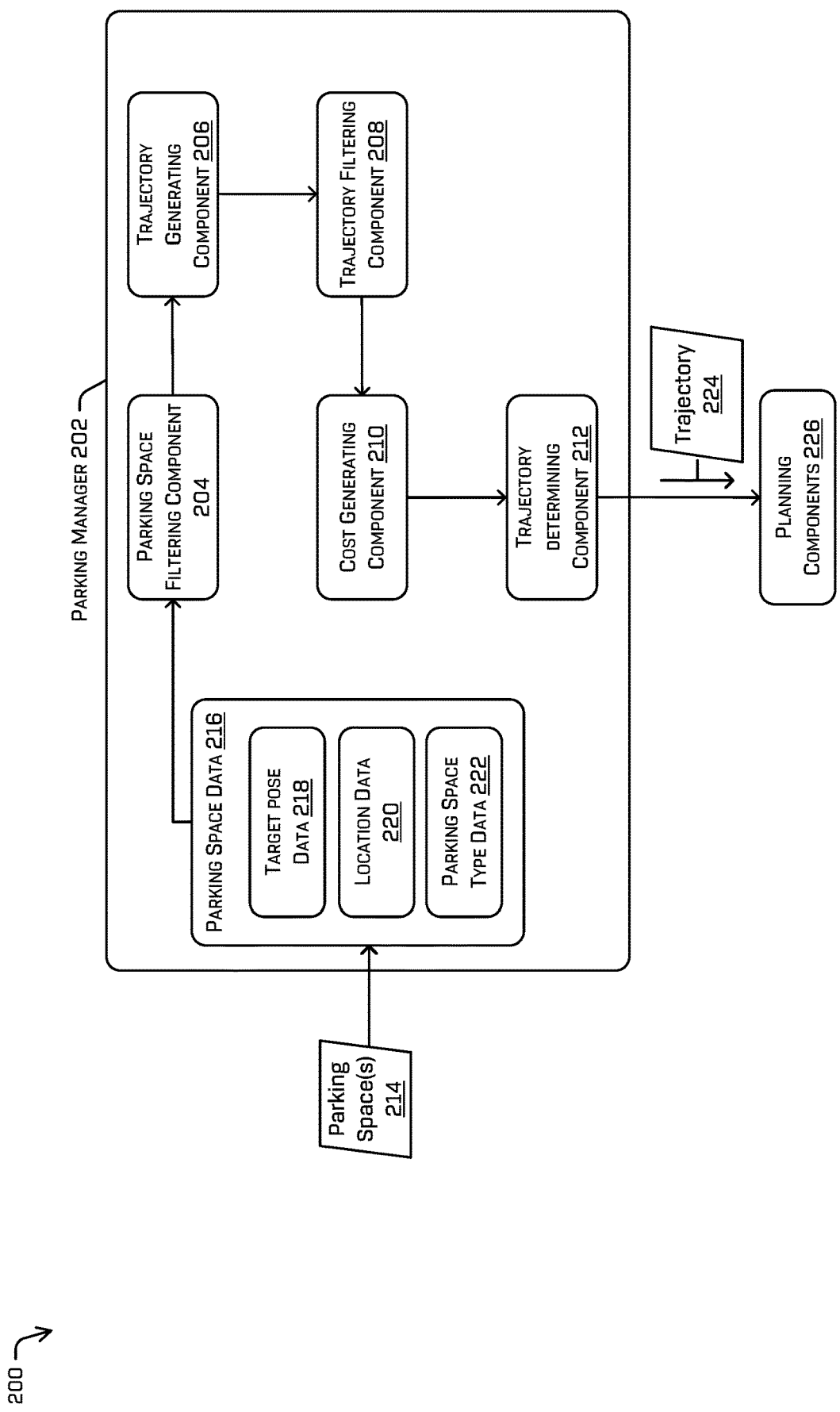
FIG. 2 illustrates an example computing system including a parking manager configured to determine a parking trajectory and/or parking space, in accordance with one or more examples of the disclosure.

FIG. 2 illustrates an example computing system 200 including a parking manager 202 configured to determine a parking trajectory and/or parking space. In some examples, the parking manager 202 may be similar or identical to the parking manager 102 described above, or in any other examples herein. As noted above, in some cases the parking manager 202 may be implemented within or otherwise associated with a perception component, prediction component, and/or planning component of an autonomous vehicle. In some examples, the parking manager 202 may include a parking space filtering component 204 configured to determine a subset of parking spaces. Additionally, the parking manager 202 may include a trajectory generating component 206 configured to generate one or more candidate trajectories associated with the subset of parking spaces, a trajectory filtering component 208 configured to determine a subset of the candidate trajectories, a cost generating component 210 configured to generate a cost associated with the candidate trajectories, and/or a trajectory determining component 212 configured to determine a candidate trajectory based on the candidate trajectory having the lowest cost.

In some examples, the parking manager 202 may receive a set of parking spaces 214. In some examples, the parking spaces 214 may be parking spaces which may be proximate to a destination of the vehicle. The parking spaces 214 may be received from a planning component, a prediction component, a database (e.g., on-vehicle database or off-vehicle database) available to the vehicle, and/or any other component. The database may include map data that indicates the locations of parking spaces 214 proximate the destination. In addition to receiving the parking spaces 214 and the associated locations of such parking spaces 214, the parking manager 202 may also receive target poses (e.g., stored in the database with the parking spaces) associated with each received parking space 214. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

In some examples, the parking manager 202 may store such parking space 214 information within a parking space data component 216. The parking space data component 216 may include subcomponents which may include a target pose data component 218 configured to receive, store, and/or analyze target poses associated with specific parking spaces 214. The parking space data component 216 may include a location data component 220 configured to receive, store, and/or analyze the location of such parking spaces 214. Further, the parking space data component 216 may include a parking space type data component 222 configured to receive, store, and/or analyze the type of parking space that was received. In some examples, the parking space data component 216 may be configured to send parking space data to the parking space filtering component 204.

In some examples, the parking manager 202 may include a parking space filtering component 204 configured to determine a subset of parking spaces. The parking space filtering component 204 may receive a set of parking spaces from the parking space data component 216. In some examples, the parking space filtering component 204 may determine a subset of parking spaces by performing filtering operations. For example, based on the parking space filtering component 204 receiving a set of parking spaces, the parking space filtering component 204 may filter a portion of the parking spaces based on a variety of characteristics, conditions, and/or factors.

In some examples, the parking space filtering component 204 may determine characteristics, conditions, and/or factors to use for filtering the set of parking spaces. The parking space filtering component 204 may determine a list of characteristics, conditions, and/or factors to evaluate when filtering the parking spaces. In some examples, characteristics, conditions, and/or factors may become more or less relevant in addition to being updated and/or changed based on the geographic location of the vehicle, the pose of the vehicle, the location of the vehicle relative to the parking spaces, the distance of the vehicle to the parking spaces, traffic conditions, and/or other factors. The list of characteristics, conditions, and/or factors may include an availability status (e.g., occupied) of a parking space, a parking space that is located behind the autonomous vehicle, a parking space that is within a threshold distance from the vehicle (e.g., the parking space is too close based on the current velocity of the vehicle), a parking space that is oriented at a suboptimal angle (e.g., determined that the angle difference between the heading of the parking space and the heading of the vehicle exceeds a threshold), a parking space that meets or exceeds a threshold distance from the vehicle (e.g., distance may be based on environment type, event data, occupant data (e.g., age, disability, etc.), etc.), a parking space that is located on the opposing side of the road, a handicap parking space (e.g., filter out if the occupant data indicates the occupant is not disabled, maintain the handicap parking space if the occupant data indicates the occupant is disabled), and/or any other characteristic, condition, and/or factor. In some examples, the parking space filtering component 204 may determine a rank and/or hierarchy of such characteristics, conditions, and/or factors. Such a rank or hierarchy may indicate a prioritization and/or importance of the characteristics, conditions, and/or factors. For example, characteristics, conditions, and/or factors with a high rank may indicate that such a condition is more important to filter out in relation to the conditions of a lower rank.

In some examples, the parking space filtering component 204 may use the characteristics, conditions, and/or factors to determine a subset of parking spaces. In some examples, the parking space filtering component 204 may evaluate the set of parking spaces using the list of characteristics, conditions, and/or factors. The parking space filtering component 204 may iterate through some or all of the parking spaces of the set of parking spaces and determine whether such parking spaces satisfy the characteristics, conditions, and/or factors. A parking space may satisfy the characteristics, conditions, and/or factors if the parking space does not fall within the description of any of the characteristics, conditions, and/or factors. In some examples, the parking space filtering component 204 may perform one or more types of filtering operations. For example, the parking space filtering component 204 may perform a first type of filtering operation configured to determine a subset of parking spaces that satisfy the listed characteristics, conditions, and/or factors. Such a filtering type may exclude parking spaces that fall within the description of any of the characteristics, conditions, and/or factors. Alternatively, or additionally, the parking space filtering component 204 may perform a second type of filtering operation configured to generate costs for each parking space in the set of parking spaces, and use such costs to determine the subset of parking spaces.

In some examples, the parking space filtering component 204 may perform a first type of filtering operation. The parking space filtering component 204 may evaluate the parking spaces according to the characteristics, conditions, and/or factors. In some examples, the parking space filtering component 204 may include parking spaces in the subset of parking spaces based on determining that the parking spaces satisfy the characteristics, conditions, and/or factors. Based on determining that a parking space falls within the description of the characteristics, conditions, and/or factors, the parking manager may exclude such a parking space from the subset of parking spaces. In contrast, if the parking space does not fall within the description of the characteristics, conditions, and/or factors, the parking space filtering component 204 may include such a parking space in the subset of parking spaces.

In some examples, the parking space filtering component 204 may determine the subset of parking spaces based on the first type of filtering operation. For example, after identifying how many parking spaces satisfied the characteristics, conditions, and/or factors, the parking space filtering component 204 may determine whether too few or too many parking spaces remain after the filtering operations. For example, the parking space filtering component 204 may compare the number of parking spaces that satisfied the conditions to a first threshold that represents a maximum allowed number of parking spaces. In some examples, if the number of remaining parking spaces exceeds the first threshold, the parking space filtering component 204 may modify the characteristics, conditions, and/or factors and re-filter the parking spaces. In alternative examples there may not be a first threshold. In some examples, the parking space filtering component 204 may also compare the number of parking spaces that satisfied the conditions to a second threshold that represents a minimum allowed number of parking spaces. In this example, the parking space filtering component 204 may modify the characteristics and/or factors based on the characteristic, condition, and/or factor rankings and re-filter the parking spaces. For example, filtering out parking spaces that are beyond a certain distance (e.g., too far away) may be the lowest ranked factor. Further, if the parking space filtering component 204 determines that there is below a threshold number of parking spaces that satisfied the conditions, the parking manager may either remove such a parking space distance filter or modify the distance to be a larger distance. After removing or modifying the factor, the parking space filtering component 204 may re-filter the parking spaces that were filtered out based on being too far away. Such parking spaces may be included in the subset based on the re-filtering. However, this is not intended to be limiting, the parking manager may rank the characteristics, conditions, and/or factors in differing orders, and may also remove and/or modify such characteristics, conditions, and/or factors in different ways.

Alternatively, or additionally, the parking space filtering component 204 may perform a second type of filtering operation. The second type of filtering may include parking space filtering component 204 generating a cost for each parking space within the set of parking spaces. The parking space filtering component 204 may generate the costs for the parking spaces based on evaluating the characteristics, conditions, and/or factors. Parking spaces with high-cost values may be indicative of suboptimal parking space, whereas parking spaces with low-cost values may be indicative of optimal parking spaces. When determining cost values, such values may be negatively affected when a parking space falls within the description of a characteristic, condition, and/or factor. Further, the rank of the characteristic, condition, and/or factor may also affect the cost values. For example, a condition may restrict vehicle form parking in handicap parking spaces when the occupants of the vehicle are not handicap. As such, the handicap parking condition may be highly ranked (e.g., weighted) and may have a large impact the cost.

In some examples, the parking space filtering component 204 may determine the subset of parking spaces based on the costs. After determining a cost for each of the parking spaces of the set of parking spaces, the parking space filtering component 204 may determine the subset of parking spaces based on including a predetermined number of parking spaces that have the lowest costs values (e.g., most optimal parking spaces). Additionally, or alternatively, the parking space filtering component 204 may also compare the cost values of the parking spaces to threshold value. In some examples, the parking space filtering component 204 may use an additional threshold validation to ensure that parking spaces with cost values that are high are not included within the subset, despite being within the predetermined number of parking spaces with the lowest cost values. As such, if parking space has a cost value that exceeds a threshold value, such a parking space may be excluded from the subset of parking spaces. In some examples, the parking space filtering component 204 may send the subset of parking spaces to the trajectory generating component 206.

In some examples, the parking manager 202 may include a trajectory generating component 206 configured to generate one or more candidate trajectories associated with the subset of parking spaces. The trajectory generating component 206 may receive the subset of parking spaces from the parking space filtering component 204. In such instances, the trajectory generating component 206 may generate trajectories associated with the subset of parking spaces. In some examples, the trajectory generating component 206 may generate a set of trajectories to each of the parking spaces of the subset of parking spaces. After determining a subset of parking spaces, the trajectory generating component 206 may generate an initial parking trajectory to each parking space of the subset of parking spaces. The trajectory generating component 206 may generate the initial parking trajectory using the state information (e.g., location data, pose data, velocity data, acceleration data, etc.) of the vehicle and the location data of the parking space. The trajectory generating component 206 may generate a parking trajectory from the location of the vehicle to a center location of the parking space. Thus, the vehicle may generate a single initial parking trajectory for each parking space.

In some examples, the trajectory generating component 206 may generate multiple candidate trajectories based on the initial parking trajectory. For example, the trajectory generating component 206 may input the initial parking trajectory into a parking trajectory generating component configured to take as input a single initial trajectory, and generate, as output, multiple candidate trajectories to the associated parking space. Such candidate trajectories may differ in numerous ways, such as the overall route, the velocity, the angle at which the vehicle approaches the parking space, the acceleration, the pose at different instances along the candidate trajectory, etc. In some examples, the trajectory generating component 206 may input some or all of the initial parking trajectories into the parking trajectory generating component. Based on inputting the initial parking trajectories into the parking trajectory generating component, the trajectory generating component 206 may include a set of candidate trajectories. In some examples, the trajectory generating component 206 may send the set of candidate trajectories to the trajectory filtering component 208.

In some examples, the parking manager 202 may include a trajectory filtering component 208 configured to determine a subset of the candidate trajectories. The trajectory filtering component 208 may receive the set of candidate trajectories from the trajectory generating component 206. In some examples, the trajectory filtering component 208 may determine a subset of candidate trajectories based on performing filtering operations. In some examples, the trajectory filtering component 208 may evaluate the set of candidate trajectories using a list of constraints. The trajectory filtering component 208 may iterate through some or all of the candidate trajectories and determine whether such candidate trajectories satisfy the constraints. A candidate trajectory may satisfy a constraint if the candidate trajectory does not fall within the description of the constraints. In some examples, a list of constraints may include a steering limitation, an acceleration limitation, a velocity limitation, a predicted interaction with an object, a crossing of adjacent parking space boundaries, a pose limitation (e.g., within the parking space and/or along the trajectory), and/or other constraints. As such, the trajectory filtering component 208 may filter out some or all of the candidate trajectories that violate some or all of the constraints. In some instances, based on performing the filtering operations, the trajectory filtering component 208 may determine a subset of candidate trajectories from the set of candidate trajectories. In some examples, the trajectory filtering component 208 may send the subset of candidate trajectories to the cost generating component 210.

In some examples, the parking manager 202 may include a cost generating component 210 configured to generate a cost associated with the candidate trajectories. The cost generating component 210 may receive the subset of candidate trajectories from the trajectory filtering component 208. In some examples, the cost generating component 210 may determine a cost associated with candidate trajectories. Based on determining the subset of candidate trajectories, the cost generating component 210 may determine a cost for each candidate trajectory of the subset candidate trajectories. The cost may be an accumulation of one or more different costs. In some examples, the cost generating component 210 may send the subset of candidate trajectories and the associated costs to the trajectory determining component 212.

In some examples, the parking manager 202 may include a trajectory determining component 212 configured to determine a candidate trajectory based on the candidate trajectory having the lowest cost. The trajectory determining component 212 may receive the subset of candidate trajectories with the associated costs from the cost generating component 210. In some examples, the trajectory determining component 212 may determine a candidate trajectory based at least in part on the cost. For example, the trajectory determining component 212 may select or otherwise determine a candidate trajectory of the subset of candidate trajectories based on determining which candidate trajectory has the lowest cost. Based on determining a candidate trajectory, the trajectory determining component 212 may cause the vehicle to follow the determined candidate trajectory, or the trajectory determining component 212 may send the candidate trajectory and the associated cost to additional planning components which may utilize such information for further planning operations. In some examples, the trajectory determining component 212 may send the trajectory 224 to a planning component 226. In such instances, the planning component 226 may utilize the trajectory 224 by causing the vehicle to follow the trajectory 224 to the parking space 214.

Figure 3A:
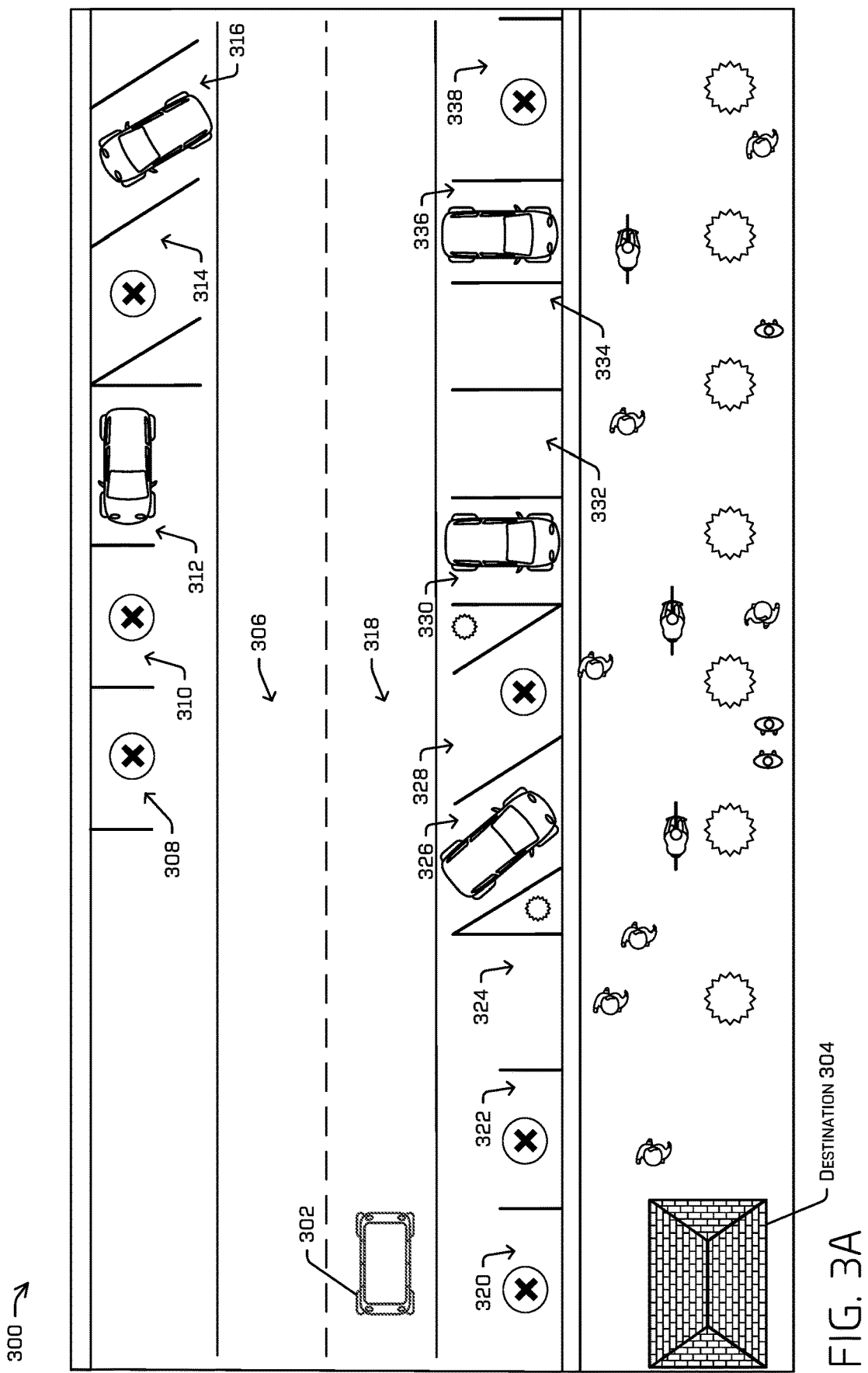
FIG. 3A depicts an example environment of a vehicle approaching a destination including numerous candidate parking spaces, in accordance with one or more examples of the disclosure.

FIG. 3A depicts an example environment 300 of a vehicle 302 approaching a destination including numerous candidate parking spaces.

In some examples, the example environment 300 may include a vehicle 302. In some examples, the vehicle 302 may be navigating to a destination 304. The destination 304 may be a pick-up location, drop off location, delivery location, and/or any other location. Further, the vehicle 302 may be approaching a set of candidate parking spaces. Such parking spaces may be located on either side of the road. For example, a first side of the road 306 may include parking space 308, parking space 310, parking space 312, parking space 314, and parking space 316. Additionally, a second side of the road 318 may include parking space 320, parking space 322, parking space 324, parking space 326, parking space 328, parking space 330, parking space 332, parking space 334, parking space 336, and parking space 338.

In some examples, the vehicle 302 may determine a subset of the parking spaces. In such instances, the vehicle 302 may filter out parking spaces that are suboptimal and/or are navigationally infeasible. As shown in the example environment 300, parking spaces that are filtered out may be represented by an "x" within a circle.

In some examples, the vehicle 302 may determine a subset of parking spaces by performing filtering operations.

For example, based on the vehicle 302 receiving a set of parking spaces, the vehicle 302 may filter a portion of the parking spaces based on a variety of characteristics, conditions, and/or factors. Such filtering techniques may enable the vehicle 302 to consider and/or evaluate a smaller subset of potential scenarios which may result in reduced processing time and/or memory consumption.

In some examples, the vehicle 302 may determine characteristics, conditions, and/or factors to use for filtering the set of parking spaces. The vehicle 302 may determine a list of characteristics, conditions, and/or factors to evaluate when filtering the parking spaces. In some examples, characteristics, conditions, and/or factors may become more or less relevant in addition to being updated and/or changed based on the geographic location of the vehicle 302, the pose of the vehicle 302, the location of the vehicle relative to the parking spaces, the distance of the vehicle to the parking spaces, traffic conditions, and/or other factors. The list of characteristics, conditions, and/or factors may include an availability status (e.g., occupied) of a parking space, a parking space that is located behind the autonomous vehicle 302, a vehicle 302 that is within a threshold distance from the vehicle 302 (e.g., the parking space is too close based on the current velocity of the vehicle 302), a parking space that is oriented at a suboptimal angle (e.g., determined that the angle difference between the heading of the parking space and the heading of the vehicle 302 exceeds a threshold), a parking space that meets or exceeds a threshold distance from the vehicle 302 and/or the destination 304 (e.g., distance may be based on environment type, event data, occupant data (e.g., age, disability, etc.), etc.), a parking space that is located on the opposing side of the road, a handicap parking space (e.g., filter out if the occupant data indicates the occupant is not disabled, maintain the handicap parking space if the occupant data indicates the occupant is disabled), and/or any other characteristic, condition, and/or factor.

In some examples, the vehicle 302 may use the characteristics, conditions, and/or factors to determine a subset of parking spaces. In some examples, the vehicle 302 may evaluate the set of parking spaces using the list of characteristics, conditions, and/or factors. The vehicle 302 may iterate through some or all of the parking spaces of the set of parking spaces and determine whether such parking spaces satisfy the characteristics, conditions, and/or factors. A parking space may satisfy the characteristics, conditions, and/or factors if the parking space does not fall within the description of any of the characteristics, conditions, and/or factors. In some examples, the vehicle 302 may perform one or more types of filtering operations. For example, the vehicle 302 may perform a first type of filtering operation configured to determine a subset of parking spaces that satisfy the listed characteristics, conditions, and/or factors. Such a filtering type may exclude parking spaces that fall within the description of any of the characteristics, conditions, and/or factors. Alternatively, or additionally, the vehicle 302 may perform a second type of filtering operation configured to generate costs for each parking space in the set of parking spaces, and use such costs to determine the subset of parking spaces.

As such, the vehicle 110 may evaluate each parking space of the set of parking spaces to determine whether such parking spaces violate and fall within the description of the characteristics, conditions, and/or factors. In such instances, the vehicle 302 may perform the filtering in any order. For example, the vehicle 302 may consider the parking spaces on the first side of the road 306. As described above, one of the conditions may be to filter out parking spaces that are on the opposite side of the road compared to the side of the road the vehicle 302 is located. Such a condition may be important to ensure that the vehicle 302 is not attempting to cross the middle traffic line into oncoming traffic. As such, the vehicle 302 may filter out parking space 308, parking space 310, parking space 312, parking space 314, and parking space 316. Further, another condition that is relevant to parking space 312, parking space 316, parking space 326, parking space 330, and parking space 336 is to filter out parking spaces that are occupied by an object (e.g., vehicle, pedestrian, bicycle, motorcycle, etc.). As such, since these parking spaces are occupied by objects, the vehicle 302 may filter out such parking spaces.

In some examples, the vehicle 302 may evaluate the parking spaces on the second side of the road 318. As described above, one of the characteristics, conditions, and/or factors may include filtering out parking spaces that are within a threshold distance from the vehicle 302 (e.g., parking spaces that are too close) and/or behind the vehicle 302. Parking spaces that are within a threshold distance from the vehicle 302 or behind the vehicle 302 may be navigationally infeasible based on the current velocity of the vehicle 302. As such, the vehicle 302 may determine that the parking space 320 and parking space 322 are within a threshold distance from and/or behind the vehicle 302. Thus, the vehicle 302 may determine to filter out such parking locations.

In some examples, the vehicle 302 may determine that parking space 324, parking space 332, and parking space 334 do not fall within nor violate the characteristics, conditions, and/or factors described above. As such, the vehicle 302 may include such parking spaces within the subset of parking spaces.

In some examples, the vehicle 302 may evaluate parking space 328 and/or the other parking spaces that are oriented at an angle. As described above, one of the conditions may include filtering out parking spaces that are oriented at an angle, as such parking spaces may create challenges when the vehicle 302 attempts to exit the parking space. As such, the vehicle 302 may determine the heading of the vehicle 302 based on utilizing state information of the vehicle 302. Further, the vehicle 302 may determine what is the heading of the parking space 328 based on utilizing the target pose information. In such instances, the vehicle 302 may determine an angle of difference based on comparing the heading of the vehicle 302 with the heading of the parking space 328. If the angle of difference meets or exceeds a threshold value, the vehicle 302 may filter such parking spaces out. In the example environment 300, the vehicle 302 may determine that parking space 314, parking space 316, parking space 326, and parking space 328 are oriented at an angle, an as such, the vehicle 302 may filter out such parking locations.

In some examples, the vehicle 302 may evaluate parking space 338 and/or the other parking spaces. As described above one of the conditions may include filtering out parking spaces that meet or exceed a threshold distance from the destination 304. Filtering out such parking spaces may ensure that occupants of the vehicle 302 do not have to walk long distances from parking space to the destination 304. As such, the vehicle 302 may determine the distance between parking space 338 and the destination 304, and if such a distance meets or exceeds a threshold distance, then the vehicle 302 may filter out the parking space 338. As shown in this example, the parking space 338 may be filtered out of the candidate parking spaces.

Figure 3B:
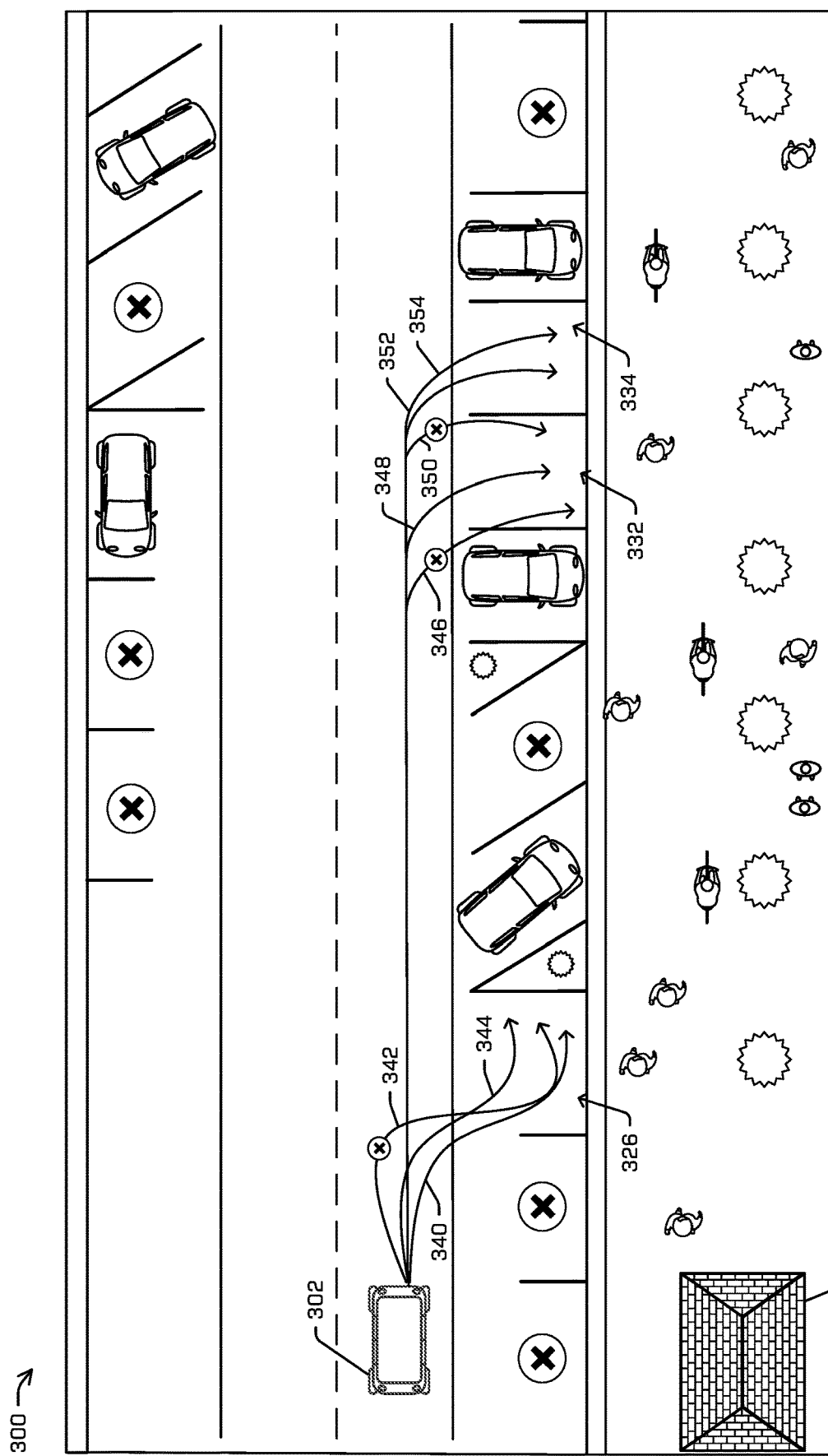
FIG. 3B depicts an example environment of a vehicle approaching a destination including numerous candidate trajectories leading to numerous candidate parking spaces, in accordance with one or more examples of the disclosure.

FIG. 3B depicts an example environment 300 of a vehicle 302 approaching a destination including numerous candidate trajectories leading to numerous candidate parking spaces.

In some examples, the example environment 300 may be the identical or similar to the example environment 300 described in FIG. 3A. As shown in FIG. 3B and described in FIG. 3A, the vehicle 302 may determine a subset of parking spaces based on filtering out parking spaces that violate and fall within the description of the characteristics, conditions, and/or factors. The example environment 300 may illustrate the filtered-out parking spaces using a circle with an "x" inside.

In some examples, the vehicle 302 may generate a set of trajectories to each of the parking spaces of the subset of parking spaces (e.g., parking space 326, parking space 332, and parking space 334). After determining a subset of parking spaces, the vehicle 302 may generate an initial parking trajectory to each parking space of the subset of parking spaces. The vehicle 302 may generate the initial parking trajectory using the state information (e.g., location data, pose data, velocity data, acceleration data, etc.) of the vehicle and the location data of the parking space. The vehicle 302 may generate a parking trajectory from the location of the vehicle to a center location of the parking space. Thus, the vehicle 302 may generate a single initial parking trajectory for each parking space.

In some examples, the vehicle 302 may generate multiple candidate trajectories based on the initial parking trajectory. For example, the vehicle 302 may input the initial parking trajectory into a parking trajectory generating component configured to take as input a single initial trajectory, and generate, as output, multiple candidate trajectories to the associated parking space. Such candidate trajectories may differ in numerous ways, such as the overall route, the velocity, the angle at which the vehicle approaches the parking space, the acceleration, the pose at different instances along the candidate trajectory, etc. In some examples, the vehicle 302 may input some or all of the initial parking trajectories into the parking trajectory generating component. Based on inputting the initial parking trajectories into the parking trajectory generating component, the parking manager may include a set of candidate trajectories.

Such techniques may be particularly advantageous when used in conjunction with methods for generating a trajectory based at least in part on a tree search, as is described in U.S. patent application Ser. No. 18/072,015 entitled "Vehicle Trajectory Tree Search for Off-Route Driving Maneuvers" filed on Nov. 30, 2022, the entire contents of which are hereby incorporated by reference herein. In such a tree search, trajectories may be selected and/or optimized based on associated costs, including all costs to arrive at a node along the tree (cost-to-come) and a cost to arrive at a final destination from the node (e.g., a cost-to-go). In such examples, the parking cost may be associated with an infinite time horizon such that it is correctly accounted for in any cost-to-go optimizations. In some examples, the parking action may be associated with navigation to, and stopping at, an identified parking space.

As shown in the example environment 300, the vehicle 302 may generate candidate trajectory 340, candidate trajectory 342, and candidate trajectory 344 that lead to the parking space 326. Further, the vehicle 302 may generate candidate trajectory 346, candidate trajectory 348, and candidate trajectory 350 that lead to the parking space 332. The vehicle 302 may generate candidate trajectory 352 and candidate trajectory 354 that lead to the parking space 334.

As described above, the various candidate trajectories may differ from one another in variety of ways.

In some examples, the vehicle 302 may determine a subset of candidate trajectories based on performing filtering operations. In some examples, the vehicle 302 may evaluate the set of candidate trajectories using a list of constraints. The vehicle 302 may iterate through some or all of the candidate trajectories and determine whether such candidate trajectories satisfy the constraints. A candidate trajectory may satisfy a constraint if the candidate trajectory does not fall within the description of the constraints. In some examples, a list of constraints may include a steering limitation, an acceleration limitation, a velocity limitation, a predicted interaction with an object, a crossing of adjacent parking space boundaries, a pose limitation (e.g., within the parking space and/or along the trajectory), and/or other constraints. As such, the parking manager may filter out some or all of the candidate trajectories that violate some or all of the constraints. In some instances, based on performing the filtering operations, the parking manager may determine a subset of candidate trajectories from the set of candidate trajectories.

When determining the subset of candidate trajectories, the vehicle 302 may evaluate each candidate trajectory. As shown, the candidate trajectory 340 and candidate trajectory 344 satisfy the constraints and to not violate any of the constraint limitations. As described above, one of the constraints may be a steering limitation for the vehicle 302. When the vehicle 302 evaluates the candidate trajectory 342 and candidate trajectory 350, the vehicle 302 may filter out such candidate trajectories based on the steering requirements of the candidate trajectories violating the steering limits. In this example, candidate trajectory 346 is filtered out based on the candidate trajectory 346 crossing a boundary of an adjacent parking space. In some examples, the remaining candidate trajectories may be included in the subset of candidate trajectories.

Figure 4:
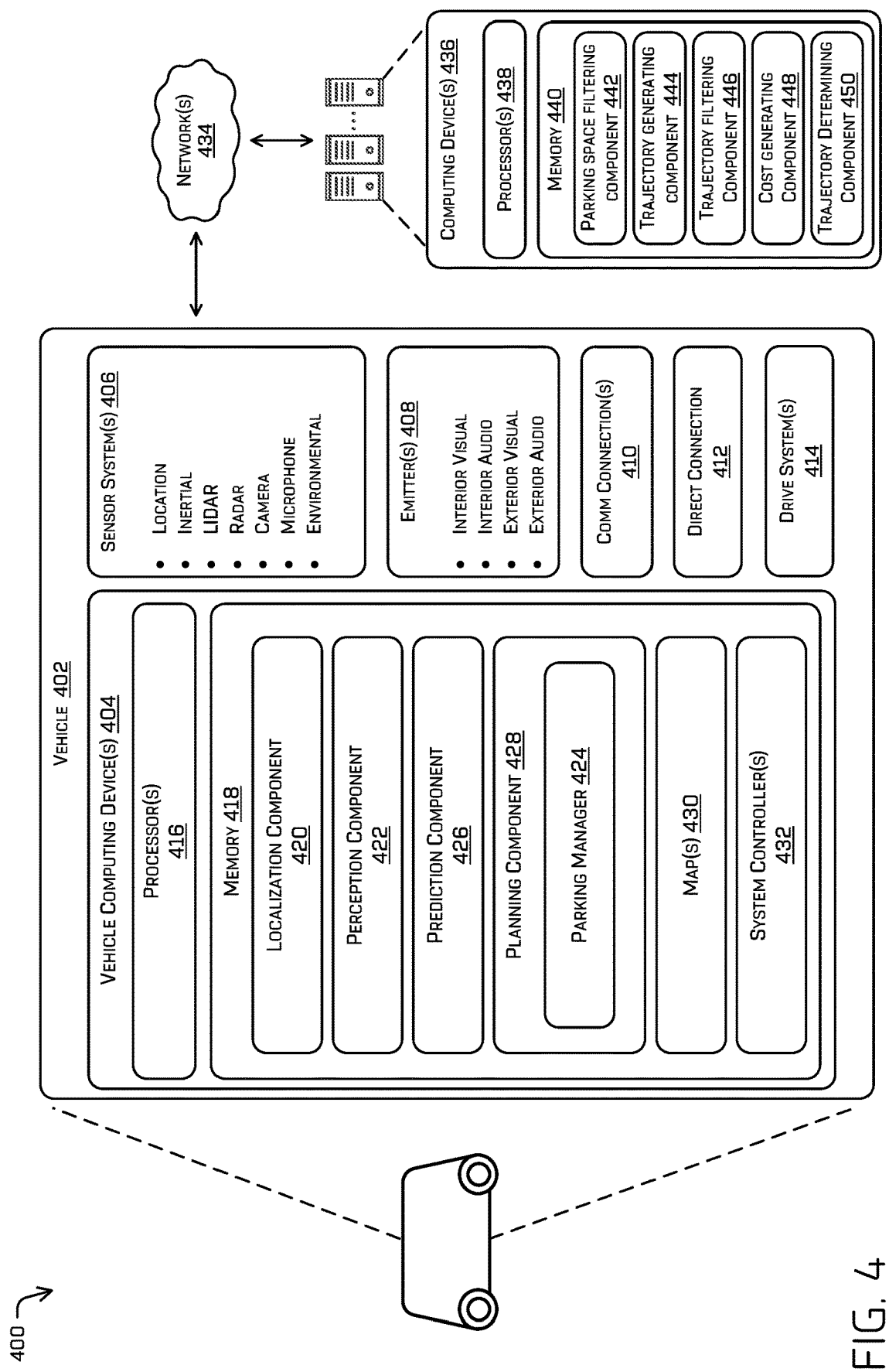
FIG. 4 depicts a block diagram of an example system for implementing various techniques described herein.

FIG. 4 is a block diagram of an example system 400 for implementing the techniques described herein. In at least one example, the system 400 may include a vehicle, such as vehicle 402. The vehicle 402 may include one or more vehicle computing devices 404, one or more sensor systems 406, one or more emitters 408, one or more communication connections 410, at least one direct connection 412, and one or more drive systems 414.

The vehicle computing device 404 may include one or more processors 416 and memory 418 communicatively coupled with the processor(s) 416. In the illustrated example, the vehicle 402 is an autonomous vehicle; however, the vehicle 402 could be any other type of vehicle, such as a semi-autonomous vehicle, or any other system having at least an image capture device (e.g., a camera-enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In the illustrated example, the memory 418 of the vehicle computing device 404 stores a localization component 420, a perception component 422, a prediction component 426, a planner component 428 including a parking manager 424, one or more system controllers 432, and one or more maps 430 (or map data). Though depicted in FIG. 4 as residing in the memory 418 for illustrative purposes, it is contemplated that the localization component 420, the perception component 422, the prediction component 426, the planner component 428 including an parking manager 424, system controller(s) 432, and/or the map(s) may additionally, or alternatively, be accessible to the vehicle 402 (e.g., stored on, or otherwise accessible by, memory remote from the vehicle 402, such as, for example, on memory 440 of one or more computing device 436). In some examples, the memory 440 may include a parking space filtering component 442, a trajectory generating component 444, a trajectory filtering component 446, a cost generating component 448, and a trajectory determining component 450.

In at least one example, the localization component 420 may include functionality to receive sensor data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430, and may continuously determine a location and/or orientation of the vehicle 402 within the environment. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 402. In some instances, the localization component 420 may provide data to various components of the vehicle 402 to determine an initial position of the vehicle 402 for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 426 may generate one or more probability maps representing prediction probabilities of possible locations of one or more objects in an environment. For example, the prediction component 426 may generate one or more probability maps for vehicles, pedestrians, animals, and the like within a threshold distance from the vehicle 402. In some instances, the prediction component 426 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 426 may generate predicted trajectories of objects (e.g., objects) in an environment. For example, the prediction component 426 may generate one or more predicted trajectories for objects within a threshold distance from the vehicle 402. In some examples, the prediction component 426 may measure a trace of an object and generate a trajectory for the object based on observed and predicted behavior.

In general, the planner component 428 may determine a path for the vehicle 402 to follow to traverse through an environment. For example, the planner component 428 may determine various routes and trajectories and various levels of detail. For example, the planner component 428 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 428 may generate an instruction for guiding the vehicle 402 along at least a portion of the route from the first location to the second location. In at least one example, the planner component 428 may determine how to guide the vehicle 402 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 428 may select a trajectory for the vehicle 402.

In other examples, the planner component 428 may alternatively, or additionally, use data from the localization component 420, the perception component 422, and/or the prediction component 426 to determine a path for the vehicle 402 to follow to traverse through an environment. For example, the planner component 428 may receive data (e.g., object data) from the localization component 420, the perception component 422, and/or the prediction component 426 regarding objects associated with an environment. In some examples, the planner component 428 receives data for relevant objects within the environment. Using this data, the planner component 428 may determine a route to travel from a first location (e.g., a current location) to a second location (e.g., a target location) to avoid objects in an environment. In at least some examples, such a planner component 428 may determine there is no such collision-free path and, in turn, provide a path that brings vehicle 402 to a safe stop avoiding all collisions and/or otherwise mitigating damage.

The parking manager 424 may be perform any of the techniques described with respect to any of FIGS. 1-3B above with respect determining parking trajectories and/or parking spaces based on multistage filtering techniques.

In at least one example, the vehicle computing device 404 may include one or more system controllers 432, which may be configured to control steering, propulsion, braking, safety, emitters, communication, and other systems of the vehicle 402. The system controller(s) 432 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 426, and/or the planner component 428 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 434. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

In some instances, aspects of some or all of the components discussed herein may include any models, techniques, and/or machine-learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 434, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device 436, other nearby vehicles, etc.) and/or one or more remote sensor system(s) for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 434. For example, the communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the parking manager 424, the prediction component 426, the planner component 428, the one or more system controllers 432, and the one or more maps 430 may process sensor data, as described above, and may send their respective outputs, over the one or more network(s) 434, to the computing device(s) 436. In at least one example, the localization component 420, the perception component 422, the parking manager 424, the prediction component 426, the planner component 428, the one or more system controllers 432, and the one or more maps 430 may send their respective outputs to the computing device(s) 436 at a particular frequency, after a lapse of a predetermined period of time, in near real-time, etc.

In some examples, the vehicle 402 may send sensor data to the computing device(s) 436 via the network(s) 434. In some examples, the vehicle 402 may receive sensor data from the computing device(s) 436 and/or remote sensor system(s) via the network(s) 434. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440, which may include a parking space filtering component 442, a trajectory generating component 444, a trajectory filtering component 446, a cost generating component 448, and a trajectory determining component 450. In some examples, the memory 440 may store one or more of components that are similar to the component(s) stored in the memory 418 of the vehicle 402. In such examples, the computing device(s) 436 may be configured to perform one or more of the processes described herein with respect to the vehicle 402. In some examples, the parking space filtering component 442, a trajectory generating component 444, a trajectory filtering component 446, a cost generating component 448, and a trajectory determining component 450 may perform substantially similar functions as the parking manager 424.

The processor(s) 416 of the vehicle 402 and the processor(s) 438 of the computing device(s) 436 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 5:
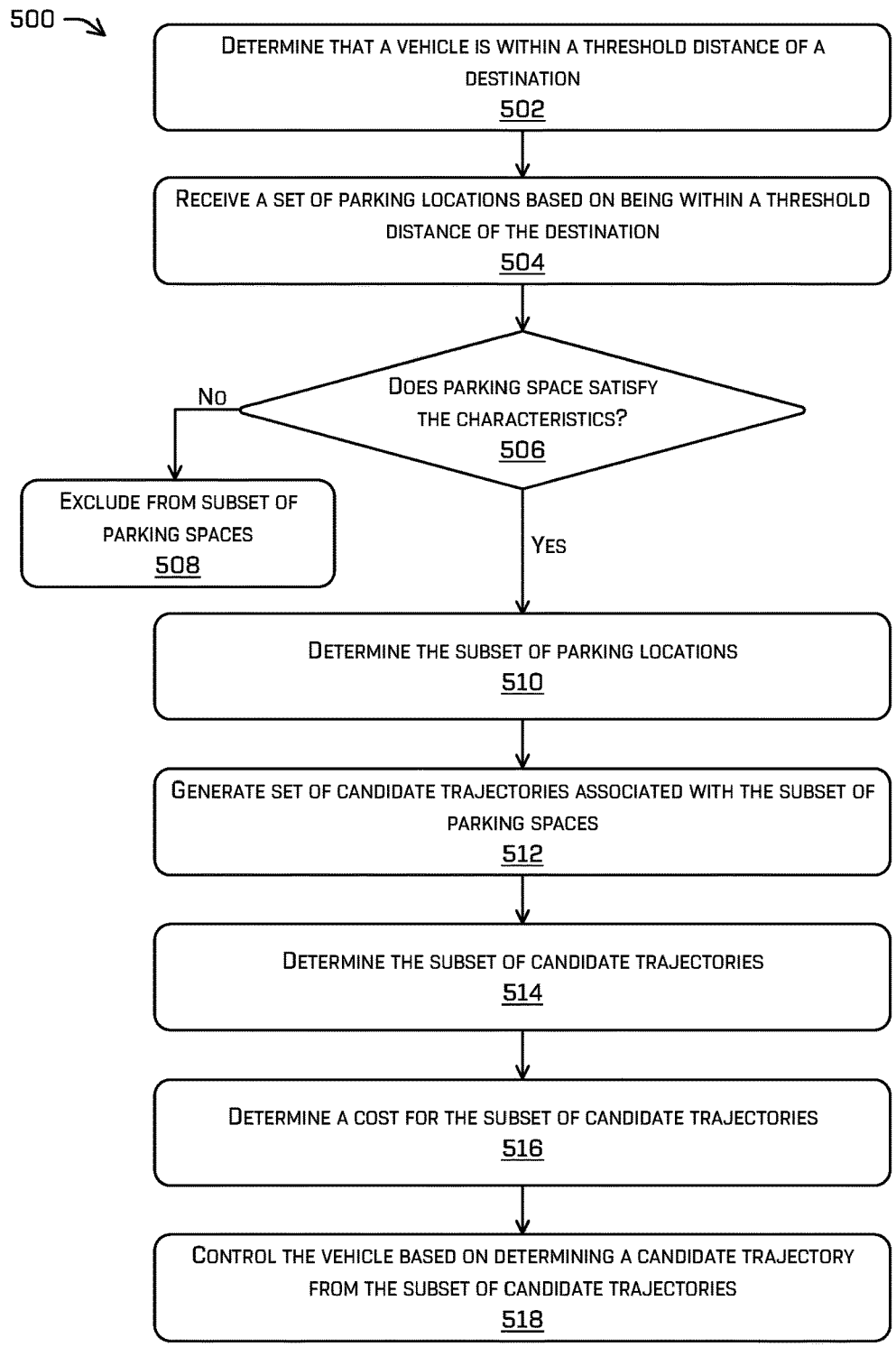
FIG. 5 is a flow diagram illustrating an example process for receiving a set of parking spaces, determining a subset of parking spaces from the set of parking spaces, generating candidate trajectories to the subset of parking spaces, determining a subset of candidate trajectories, determining a cost for the subset of candidate trajectories, and determining a candidate trajectory based on the cost.

FIG. 5 is a flow diagram illustrating an example process 500 for receiving a set of parking spaces, determining a subset of parking spaces from the set of parking spaces, generating a set of candidate trajectories associated with the subset of parking spaces, determining a subset of candidate trajectories, determining a cost for the subset of candidate trajectories, and determining a candidate trajectory based on the cost. As described below, example process 500 may be performed by one or more computer-based components configured to implement various functionalities described herein. For instance, some or all of the operations of example process 500 may be performed by a parking manager 202 configured determine parking trajectories and/or parking spaces based on multistage filtering techniques. As described above, a parking manager 202 may be integrated as an on-vehicle system in some examples. However, in other examples, the parking manager 202 may be integrated as a separate server-based system.

Process 500 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 502, the parking manager may include determining that a vehicle is within a threshold distance of a destination. A vehicle may receive a request and/or instructions to navigate to a destination. Such requests may include transporting pedestrians and/or customers between pickup and drop off locations, in addition to delivering goods and/or services to regions of the environment. Based on the request, the vehicle may receive a trajectory to follow while navigating through the environment to the destination.

In some examples, the vehicle may transition mode types based on being within a threshold distance of the destination. The vehicle may utilize numerous operation modes configured to instruct the vehicle when and how to generate and/or select trajectories. Use of such modes may be determined based on the location of the vehicle within the environment, the location of the vehicle relative to the destination, and/or the action being performed by the vehicle. In some examples, different operating mode types may cause the vehicle to perform different operations when generating, selecting, and/or determining a trajectory to follow. When operating in a primary mode, the vehicle may perform a first set of operations. In such instances, the vehicle may use the first set of operations to generate a trajectory and/or determining which potential trajectory to select while navigating to the destination. Further, when operating in a parking mode, the parking manager may perform a second set of operations. The second set of operations may include some or all of the first set of operations, in addition to additional operations. Based on being in a parking mode, the parking manager may perform additional operations associated with determining or otherwise selecting parking trajectories and/or parking spaces. In some examples, the vehicle may transition from the primary mode to a parking mode based on determining that the vehicle is within a threshold distance from the destination. In such instances, the threshold distance may be determined based on a number of different factors, such as the environment type, time of day, and/or other factors. In other situations, the threshold distance may be a fixed distance from the destination.

At operation 504, the parking manager my include receiving a set of parking locations based on being within a threshold distance. The vehicle may receive a set of parking locations (e.g., parking spaces, parking garages, parking lots, etc.) within a threshold distance of the destination. The threshold distance may be determined based on a number of factors, such as an environment type (e.g., city, neighborhood, etc.), occupant characteristics (e.g., age, disability, etc.), event data, historical data (e.g., previously used parking spaces proximate the destination, previous parking availability proximate the destination, etc.), etc. The vehicle may receive the set of parking spaces from a database (e.g., on-vehicle database or off-vehicle database) available to the vehicle. The database may include map data that indicates the locations of parking spaces proximate the destination. In addition to receiving the set of parking spaces and the associated locations of such parking spaces, the parking manager may also receive the shape and/or size (e.g., dimensions) of the parking spaces, in addition to the target poses associated with each received parking space. Such information may be stored in a databased with the parking spaces. A target pose may represent an optimal position and orientation (two- or three-dimensional heading) of a vehicle within the parking space. The target position may include a target lateral offset (e.g., y-axis) coordinate and a target longitudinal offset (e.g., x-axis) coordinate of the vehicle.

At operation 506, the parking manager may determine whether the set of parking spaces satisfy the characteristics. For example, the parking manager may determine a subset of parking spaces by performing filtering operations. For example, based on the parking manager receiving a set of parking spaces, the parking manager may filter a portion of the parking spaces based on a variety of characteristics, conditions, and/or factors.

In some examples, the parking manager may determine characteristics, conditions, and/or factors to use for filtering the set of parking spaces. The parking manager may determine a list of characteristics, conditions, and/or factors to evaluate when filtering the parking spaces. In some examples, characteristics, conditions, and/or factors may become more or less relevant in addition to being updated and/or changed based on the geographic location of the vehicle, the pose of the vehicle, the location of the vehicle relative to the parking spaces, the distance of the vehicle to the parking spaces, traffic conditions, and/or other factors. The list of characteristics, conditions, and/or factors may include an availability status (e.g., occupied) of a parking space, a parking space that is located behind the autonomous vehicle, a parking space that is within a threshold distance from the vehicle (e.g., the parking space is too close based on the current velocity of the vehicle), a parking space that is oriented at a suboptimal angle (e.g., determined that the angle difference between the heading of the parking space and the heading of the vehicle exceeds a threshold), a parking space that meets or exceeds a threshold distance from the vehicle (e.g., distance may be based on environment type, event data, occupant data (e.g., age, disability, etc.), etc.), a parking space that is located on the opposing side of the road, a handicap parking space (e.g., filter out if the occupant data indicates the occupant is not disabled, maintain the handicap parking space if the occupant data indicates the occupant is disabled), and/or any other characteristic, condition, and/or factor.

In some examples, the parking manager may use the characteristics, conditions, and/or factors to determine a subset of parking spaces. In some examples, the parking manager may evaluate the set of parking spaces using the list of characteristics, conditions, and/or factors. The parking manager may iterate through some or all of the parking spaces of the set of parking spaces and determine whether such parking spaces satisfy the characteristics, conditions, and/or factors. A parking space may satisfy the characteristics, conditions, and/or factors if the parking space does not fall within the description of any of the characteristics, conditions, and/or factors. As such, if the parking spaces do not satisfy the characteristics (506: No), then the parking manager may exclude the parking spaces from the subset of parking spaces. At operation 508, the parking manager may determine that the parking space falls within the description of one or more of the characteristics, and as such, may exclude the parking space from the subset.

In contrast, if the parking space satisfy the characteristics (506: Yes), then the parking manager may include the parking space in the subset of parking spaces. At operation 510, the parking manager may determine the subset of parking locations based on including the parking spaces which satisfy the characteristics.

At operation 512, the parking manager may generate a set of candidate trajectories associated with the subset of parking spaces. After determining a subset of parking spaces at operation 510, the parking manager may generate an initial parking trajectory to each parking space of the subset of parking spaces. The parking manager my generate the initial parking trajectory using the state information (e.g., location data, pose data, velocity data, acceleration data, etc.) of the vehicle and the location data of the parking space. The parking manager may generate a parking trajectory from the location of the vehicle to a center location of the parking space. Thus, the vehicle may generate a single initial parking trajectory for each parking space.

In some examples, the parking manager may generate multiple candidate trajectories based on the initial parking trajectory. For example, the parking manager may input the initial parking trajectory into a parking trajectory generating component configured to take as input a single initial trajectory, and generate, as output, multiple candidate trajectories to the associated parking space. Such candidate trajectories may differ in numerous ways, such as the overall route, the velocity, the angle at which the vehicle approaches the parking space, the acceleration, the pose at different instances along the candidate trajectory, etc. In some examples, the parking manager may input some or all of the initial parking trajectories into the parking trajectory generating component. Based on inputting the initial parking trajectories into the parking trajectory generating component, the parking manager may include a set of candidate trajectories. At operation 514, the parking manager may determine a subset of candidate trajectories from the set of candidate trajectories based on the candidate trajectories satisfying the constraints. In some examples, the parking manager may evaluate the set of candidate trajectories using a list of constraints. The parking manager may iterate through some or all of the candidate trajectories and determine whether such candidate trajectories satisfy the constraints. A candidate trajectory may satisfy a constraint if the candidate trajectory does not fall within the description of the constraints. In some examples, a list of constraints may include a steering limitation, an acceleration limitation, a velocity limitation, a predicted interaction with an object, a crossing of adjacent parking space boundaries, a pose limitation (e.g., within the parking space and/or along the trajectory), and/or other constraints.

At operation 516, the parking manager may determine a cost of the set of candidate trajectories. In some examples, the parking manager may determine a cost associated with the candidate trajectories. Based on determining the subset of candidate trajectories, the parking manager may determine a cost for each candidate trajectory of the subset candidate trajectories. The cost may be an accumulation of one or more different costs. Such costs may include a reference cost, an obstacle cost, a steering cost, an acceleration cost, a yaw cost, a space cost, an approach cost, an exit cost, a debris cost, a safety cost, a payment cost, and/or any other type of cost. In such instances, the parking manager 102 may combine the various costs into a single overall cost. Such costs may be weighted differently, and as such, different costs may affect the overall cost in different proportions.

At operation 518, the parking manager may control the vehicle based on determining a candidate trajectory from the subset of candidate trajectories. In some examples, the parking manager may determine a cost associated with candidate trajectories. Based on determining the subset of candidate trajectories, the parking manager may determine a cost for each candidate trajectory of the subset candidate trajectories. The cost may be an accumulation of one or more different costs.

In some examples, the parking manager may determine a candidate trajectory based at least in part on the cost. For example, the parking manager may select or otherwise determine a candidate trajectory of the subset of candidate trajectories based on determining which candidate trajectory has the lowest cost. Based on determining a candidate trajectory, the parking manager may cause the vehicle to follow the determined candidate trajectory.

In some examples, the parking manager may cause the vehicle to traverse to the parking space based on the candidate trajectory. Upon identifying the candidate trajectory with the lowest cost, the vehicle may follow the candidate trajectory to the parking space. Further, the candidate trajectory may cause the vehicle to park within the parking space according to the state information.

Example Clauses

A: A system comprising: one or more processors; and one or more non-transitory computer-readable media storing computer-executable instructions that, when executed, cause the one or more processors to perform operations comprising: determining that an autonomous vehicle is within a threshold distance from a destination; receiving, based at least in part on being within the threshold distance, a set of parking locations; identifying for a parking location of the set of parking locations a parking characteristic; determining, based at least in part on the parking characteristic, whether to include the parking location in a subset of parking locations; determining, based at least in part on the subset of parking locations, a plurality of trajectories; determining a control trajectory from the plurality of trajectories; and controlling the autonomous vehicle based at least in part on the control trajectory.

B: The system of paragraph A, wherein the parking characteristic comprises at least one of: an availability of the parking location, a first distance between the parking location and the autonomous vehicle meeting or exceeding a first threshold, a second distance between the parking location and the autonomous vehicle being at or below second threshold, a side of a road associated with the parking location, or a type of parking space associated with the parking location.

C: The system of paragraph A, wherein the operations further comprise: determining a plurality of costs associated with the plurality of trajectories; and determining, as the control trajectory, a trajectory of the plurality of trajectories having a lowest cost.

D: The system of paragraph A, wherein the operations further comprise: determining a number of parking spaces in the subset of parking spaces is less than or equal to a threshold number of parking spaces; based at least in part on determining the number of parking spaces is less than or equal to the threshold number of parking spaces, modifying the parking characteristic; and determining a second subset of parking spaces.

E: The system of paragraph A, wherein the threshold distance is based at least at least in part on: an environment type, a characteristic of a passenger of the autonomous vehicle, event data, or historical data.

F: One or more non-transitory computer-readable media storing instructions executable by one or more processors, wherein the instructions, when executed, cause the one or more processors to perform operations comprising: determining that a vehicle is within a threshold distance from a destination; receiving, based at least in part on being within a threshold distance, a set of parking locations; identifying a parking characteristic associated with a parking location of the set of parking locations; determining, based at least in part on the parking characteristic, a subset of parking locations of the set of parking locations; determining, based at least in part on the set of parking locations, a set of candidate trajectories; and controlling a vehicle based at least in part on the set of candidate trajectories.

G: The one or more non-transitory computer-readable media of paragraph F, wherein the parking characteristic comprises at least one of: an availability of the parking location, a first distance between the parking location and the vehicle meeting or exceeding a first threshold, a second distance between the parking location and the vehicle at or being below second threshold, a side of a road of the parking location, or a type of parking space of the parking location.

H: The one or more non-transitory computer-readable media of paragraph G, wherein the parking characteristic is further associated with a rank.

I: The one or more non-transitory computer-readable media of paragraph F, wherein the operations further comprise: determining, based at least in part on a constraint, a subset of trajectories of the set of trajectories that satisfy the constraint; determining a cost associated with a trajectory of the subset of trajectories; and determining, based at least in part on the cost, a control trajectory, wherein controlling the vehicle comprises controlling the vehicle in accordance with the control trajectory.

J: The one or more non-transitory computer-readable media of paragraph I, wherein the constraint comprises at least one of: a steering limitation of the vehicle, an acceleration limitation of the vehicle, a velocity limitation of the vehicle, or a predicted intersection with an object.

K: The one or more non-transitory computer-readable media of paragraph F, wherein the threshold distance is based at least at least in part on: an environment type, a characteristic of a passenger of the vehicle, event data, or historical data.

L: The one or more non-transitory computer-readable media of paragraph H, wherein controlling the vehicle based at least in part on the set of candidate trajectories comprises determining a trajectory of the set of candidate trajectories based at least in part on the rank.

M: The one or more non-transitory computer-readable media of paragraph F, further comprising: determining a number of parking spaces in the subset of parking spaces is less than or equal to a threshold number of parking spaces; based at least in part on determining the number of parking spaces is less than or equal to the threshold number of parking spaces, modifying the parking characteristic; and determining a second subset of parking spaces based at least in part on the modified parking characteristic.

N: A method comprising: determining that a vehicle is within a threshold distance from a destination; receiving, based at least in part on being within a threshold distance, a set of parking locations; identifying a parking characteristic associated with a parking location of the set of parking locations; determining, based at least in part on the parking characteristic, a subset of parking locations of the set of parking locations; determining, based at least in part on the set of parking locations, a set of candidate trajectories; and controlling a vehicle based at least in part on the set of candidate trajectories.

O: The method of paragraph N, wherein the parking characteristic comprises at least one of: an availability of the parking location, a first distance between the parking location and the vehicle meeting or exceeding a first threshold, a second distance between the parking location and the vehicle at or being below second threshold, a side of a road of the parking location, or a type of parking space of the parking location.

P: The method of paragraph O, wherein the parking characteristic is further associated with a rank.

Q: The method of paragraph N, further comprising: determining, based at least in part on a constraint, a subset of trajectories of the set of trajectories that satisfy the constraint; determining a cost associated with a trajectory of the subset of trajectories; and determining, based at least in part on the cost, a control trajectory, wherein controlling the vehicle comprises controlling the vehicle in accordance with the control trajectory.

R: The method of paragraph Q, wherein the constraint comprises at least one of: a steering limitation of the vehicle, an acceleration limitation of the vehicle, a velocity limitation of the vehicle, or a predicted intersection with an object.

S: The method of paragraph N, wherein the threshold distance is based at least at least in part on: an environment type, a characteristic of a passenger of the vehicle, event data, or historical data.

T: The method of paragraph P, wherein controlling the vehicle based at least in part on the set of candidate trajectories comprises determining a trajectory of the set of candidate trajectories based at least in part on the rank.

U: A system comprising: one or more processors; and one or more non-transitory computer-readable media storing computer-executable instructions that, when executed, cause the one or more processors to perform operations comprising: determining that an autonomous vehicle is within a threshold distance from a destination; receiving, based at least in part on the autonomous vehicle being within the threshold distance from the destination, a set of parking locations; identifying parking characteristics associated with the set of parking locations; determining, based at least in part on the parking characteristics, a subset of parking locations of the set of parking locations, wherein the subset of parking locations satisfy the parking characteristics; generating a set of trajectories associated with at least one of the subset of parking locations; determining a cost associated with an individual trajectory of the set of trajectories; determining, based at least in part on the cost, a candidate trajectory of the subset of trajectories; and controlling the autonomous vehicle based at least in part on the candidate trajectory.

V: The system of paragraph U, wherein the parking characteristics comprise at least one of: an availability of the parking location, a first distance between the parking location and the autonomous vehicle meeting or exceeding a first threshold, a second distance between the parking location and the autonomous vehicle being at or below second threshold, a side of a road of the parking location, or a type of parking space of the parking location.

W: The system of paragraph U, wherein generating the set of trajectories is based at least in part on: generating an initial trajectory to a second parking location; generating, based at least in part on the initial trajectory, a second candidate trajectory to the second parking location; and generating, based at least in part on the initial trajectory, a third candidate trajectory to the second parking location, wherein the second candidate trajectory is different than the third candidate trajectory.

X: The system of paragraph U, wherein determining the cost associated with the individual trajectory comprises determining a subset of trajectories of the set of trajectories based at least in part on a constraint, and wherein the constraints comprise at least one of: a steering limitation of the autonomous vehicle, an acceleration limitation of the autonomous vehicle, a velocity limitation of the autonomous vehicle, or a predicted intersection with an object.

Y: The system of paragraph U, wherein determining the subset of parking locations comprises: determining an additional cost associated with a second parking location of the set of parking locations, wherein the additional cost is determined based at least in part on the parking characteristics; and determining that the additional cost associated with the second parking location meets or exceeds a threshold value; and determining, based at least in part on the additional cost meeting or exceeding the threshold value, that the second parking location satisfies the parking characteristics.

Z: One or more non-transitory computer-readable media storing instructions executable by one or more processors, wherein the instructions, when executed, cause the one or more processors to perform operations comprising: determining that a vehicle is within a threshold distance from a destination; receiving, based at least in part on the vehicle being within the threshold distance from the destination, a set of parking locations; identifying parking characteristics associated with the set of parking locations; determining, based at least in part on the parking characteristics, a subset of parking locations of the set of parking locations; generating a set of trajectories associated with a parking location of the subset of parking locations; and controlling a vehicle based at least in part on the set of trajectories.

AA: The one or more non-transitory computer-readable media of paragraph Z, wherein the parking characteristics comprise at least one of: an availability of a second parking location, a first distance between the parking location and the vehicle meeting or exceeding a first threshold, a second distance between the parking location and the vehicle being at or below second threshold, a side of a road of the second parking location, or a type of parking space of the second parking location.

AB: The one or more non-transitory computer-readable media of paragraph Z, wherein the operations for generating the set of trajectories are based at least in part on: generating an initial trajectory to a second parking location; generating, based at least in part on the initial trajectory, a second candidate trajectory to the second parking location; and generating, based at least in part on the initial trajectory, a third candidate trajectory to the second parking location, wherein the second candidate trajectory is different than the third candidate trajectory.

AC: The one or more non-transitory computer-readable media of paragraph Z, wherein controlling the vehicle comprises determining a subset of trajectories of the set of trajectories based at least in part on a constraint, and wherein the constraint comprises at least one of: a steering limitation of the vehicle, an acceleration limitation of the vehicle, a velocity limitation of the vehicle, or a predicted intersection with an object.

AD: The one or more non-transitory computer-readable media of paragraph Z, wherein the operations for determining the subset of parking locations comprises: determining a cost associated with a second parking location of the set of parking locations, wherein the cost is determined based at least in part on the parking characteristics; and determining that the cost of the second parking location is within a threshold value; and determining, based at least in part on the cost being within the threshold value, that the second parking location satisfies the parking characteristics.

AE: The one or more non-transitory computer-readable media of paragraph Z, wherein controlling the vehicle: determining a cost associated with a candidate trajectory of the set of trajectories; and determining, based at least in part on the cost, to control the vehicle in accordance with the candidate trajectory.

AF: The one or more non-transitory computer-readable media of paragraph Z, wherein the threshold distance is based at least at least in part on: an environment type, a characteristic of a passenger of the vehicle, event data, or historical data.

AG: The one or more non-transitory computer-readable media of paragraph Z, wherein controlling the vehicle based at least in part on the set of candidate trajectories comprises determining a trajectory of the set of candidate trajectories based at least in part on ranking the set of candidate trajectories.

AH: A method comprising: determining that a vehicle is within a threshold distance from a destination; receiving, based at least in part on the vehicle being within the threshold distance from the destination, a set of parking locations; identifying parking characteristics associated with the set of parking locations; determining, based at least in part on the parking characteristics, a subset of parking locations of the set of parking locations; generating a set of trajectories associated with a parking location of the subset of parking locations; and controlling a vehicle based at least in part on the set of trajectories.

AI: The method of paragraph AH, wherein the parking characteristics comprise at least one of: an availability of a second parking location, a first distance between the parking location and the vehicle meeting or exceeding a first threshold, a second distance between the parking location and the vehicle being at or below second threshold, a side of a road of the second parking location, or a type of parking space of the second parking location.

AJ: The method of paragraph AH, wherein generating the set of trajectories is based at least in part on: generating an initial trajectory to a second parking location; generating, based at least in part on the initial trajectory, a second candidate trajectory to the second parking location; and generating, based at least in part on the initial trajectory, a third candidate trajectory to the second parking location, wherein the second candidate trajectory is different than the third candidate trajectory.

AK: The method of paragraph AH, wherein controlling the vehicle comprises determining a subset of trajectories of the set of trajectories based at least in part on a constraint, and wherein the constraint comprises at least one of: a steering limitation of the vehicle, an acceleration limitation of the vehicle, a velocity limitation of the vehicle, or a predicted intersection with an object.

AL: The method of paragraph AH, wherein determining the subset of parking locations comprises: determining a cost associated with a second parking location of the set of parking locations, wherein the cost is determined based at least in part on the parking characteristics; and determining that the cost of the second parking location is within a threshold value; and determining, based at least in part on the cost being within the threshold value, that the second parking location satisfies the parking characteristics.

AM: The method of paragraph AH, wherein controlling the vehicle: determining a cost associated with a candidate trajectory of the set of trajectories; and determining, based at least in part on the cost, to control the vehicle in accordance with the candidate trajectory.

AN: The method of paragraph AH, wherein the threshold distance is based at least at least in part on: an environment type, a characteristic of a passenger of the vehicle, event data, or historical data.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the one or more processors to perform operations comprising:
   determining that an autonomous vehicle is within a threshold distance from a destination;
   receiving, based at least in part on being within the threshold distance, a set of parking locations;
   identifying for a parking location of the set of parking locations a parking characteristic;
   determining, based at least in part on the parking characteristic, whether to include the parking location in a subset of parking locations;
   determining, based at least in part on the subset of parking locations, a plurality of trajectories that include vehicle acceleration data or vehicle steering angle data and at least two of the plurality of trajectories configured to control the autonomous vehicle to enter a same parking location of the subset of parking locations;
   determining a control trajectory from the plurality of trajectories; and
   controlling the autonomous vehicle based at least in part on the control trajectory.

2. The system of claim 1, wherein the parking characteristic comprises at least one of:
   an availability of the parking location,
   a first distance between the parking location and the autonomous vehicle meeting or exceeding a first threshold,
   a second distance between the parking location and the autonomous vehicle being at or below second threshold,
   a side of a road associated with the parking location, or
   a type of parking space associated with the parking location.

3. The system of claim 1, wherein the operations further comprise:
   determining a plurality of costs associated with the plurality of trajectories; and
   determining, as the control trajectory, a trajectory of the plurality of trajectories having a lowest cost.

4. The system of claim 1, wherein the operations further comprise:
   determining a number of parking spaces in the subset of parking locations is less than or equal to a threshold number of parking spaces;
   based at least in part on determining the number of parking spaces is less than or equal to the threshold number of parking spaces, modifying the parking characteristic; and
   determining a second subset of parking locations.

5. The system of claim 1, wherein the threshold distance is based at least at least in part on:
   an environment type,
   a characteristic of a passenger of the autonomous vehicle,
   event data, or
   historical data.

6. One or more non transitory computer readable media storing instructions executable by one or more processors, wherein the instructions, when executed, cause the one or more processors to perform operations comprising:
   determining that a vehicle is within a threshold distance from a destination;
   receiving, based at least in part on being within the threshold distance, a set of parking locations;
   identifying a parking characteristic associated with a parking location of the set of parking locations;
   determining, based at least in part on the parking characteristic, a subset of parking locations of the set of parking locations;

determining, based at least in part on the set of parking locations, a set of candidate trajectories that include vehicle acceleration data or vehicle steering angle data to enter the parking location of the set of parking locations, wherein at least two of the set of candidate trajectories configured to control the vehicle to enter the parking location; and controlling the vehicle based at least in part on the set of candidate trajectories.

7. The one or more non transitory computer readable media of claim 6, wherein the parking characteristic comprises at least one of:
an availability of the parking location,
a first distance between the parking location and the vehicle meeting or exceeding a first threshold,
a second distance between the parking location and the vehicle at or being below second threshold,
a side of a road of the parking location, or
a type of parking space of the parking location.

8. The one or more non transitory computer readable media of claim 7, wherein the parking characteristic is further associated with a rank.

9. The one or more non transitory computer readable media of claim 6, wherein the operations further comprise:
determining, based at least in part on a constraint, a subset of trajectories of the set of candidate trajectories that satisfy the constraint;
determining a cost associated with a trajectory of the subset of trajectories; and
determining, based at least in part on the cost, a control trajectory,
wherein controlling the vehicle comprises controlling the vehicle in accordance with the control trajectory.

10. The one or more non transitory computer readable media of claim 9, wherein the constraint comprises at least one of:
a steering limitation of the vehicle,
an acceleration limitation of the vehicle,
a velocity limitation of the vehicle, or
a predicted intersection with an object.

11. The one or more non transitory computer readable media of claim 6, wherein the threshold distance is based at least at least in part on:
an environment type,
a characteristic of a passenger of the vehicle,
event data, or
historical data.

12. The one or more non transitory computer readable media of claim 8, wherein controlling the vehicle based at least in part on the set of candidate trajectories comprises determining a trajectory of the set of candidate trajectories based at least in part on the rank.

13. The one or more non transitory computer readable media of claim 6, the operations further comprising:
determining a number of parking spaces in the subset of parking locations is less than or equal to a threshold number of parking spaces;
based at least in part on determining the number of parking spaces is less than or equal to the threshold number of parking spaces, determining a modified parking characteristic associated with the parking characteristic; and determining a second subset of parking spaces based at least in part on the modified parking characteristic.

14. A method comprising:
determining that a vehicle is within a threshold distance from a destination;
receiving, based at least in part on being within the threshold distance, a set of parking locations;
identifying a parking characteristic associated with a parking location of the set of parking locations;
determining, based at least in part on the parking characteristic, a subset of parking locations of the set of parking locations, wherein determining whether to include the parking location in the subset of parking locations is based at least in part on a modified parking characteristic of the parking characteristic;
determining, based at least in part on the set of parking locations, a set of candidate trajectories that include vehicle acceleration data or vehicle steering angle data; and
controlling the vehicle based at least in part on the set of candidate trajectories.

15. The method of claim 14, wherein the parking characteristic comprises at least one of:
an availability of the parking location,
a first distance between the parking location and the vehicle meeting or exceeding a first threshold,
a second distance between the parking location and the vehicle at or being below second threshold,
a side of a road of the parking location, or
a type of parking space of the parking location.

16. The method of claim 15, wherein the parking characteristic is further associated with a rank.

17. The method of claim 14, further comprising:
determining, based at least in part on a constraint, a subset of trajectories of the set of candidate trajectories that satisfy the constraint;
determining a cost associated with a trajectory of the subset of trajectories; and
determining, based at least in part on the cost, a control trajectory,
wherein controlling the vehicle comprises controlling the vehicle in accordance with the control trajectory.

18. The method of claim 17, wherein the constraint comprises at least one of:
a steering limitation of the vehicle,
an acceleration limitation of the vehicle,
a velocity limitation of the vehicle, or
a predicted intersection with an object.

19. The method of claim 14, wherein the threshold distance is based at least at least in part on:
an environment type,
a characteristic of a passenger of the vehicle,
event data, or
historical data.

20. The method of claim 16, wherein controlling the vehicle based at least in part on the set of candidate trajectories comprises determining a trajectory of the set of candidate trajectories based at least in part on the rank.

* * * * *